US007694217B2

(12) United States Patent
Croft et al.

(10) Patent No.: US 7,694,217 B2
(45) Date of Patent: Apr. 6, 2010

(54) SYSTEMS AND METHODS FOR COMPARING DOCUMENTS CONTAINING GRAPHIC ELEMENTS

(75) Inventors: Lawrence Croft, Burnaby (CA); Robert T. Morgan, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 980 days.

(21) Appl. No.: 11/421,210

(22) Filed: May 31, 2006

(65) Prior Publication Data

US 2006/0242570 A1 Oct. 26, 2006

Related U.S. Application Data

(63) Continuation-in-part of application No. 11/129,349, filed on May 16, 2005, now Pat. No. 7,536,636, which is a continuation-in-part of application No. 11/114,078, filed on Apr. 26, 2005, now Pat. No. 7,555,712.

(51) Int. Cl.
*G06F 17/00* (2006.01)
(52) U.S. Cl. .................................. 715/229; 715/255
(58) Field of Classification Search ................. 715/229, 715/230, 232, 233, 255, 243, 244, 246, 247
See application file for complete search history.

(56) References Cited

U.S. PATENT DOCUMENTS

| 4,827,330 | A | * | 5/1989 | Walsh et al. ................ 358/452 |
| 5,465,353 | A | * | 11/1995 | Hull et al. ...................... 707/5 |
| 5,606,651 | A | | 2/1997 | Brown et al. ................. 395/133 |
| 5,666,549 | A | * | 9/1997 | Tsuchiya et al. ............. 715/223 |
| 5,815,704 | A | * | 9/1998 | Shimotsuji et al. .......... 707/100 |
| 5,890,177 | A | | 3/1999 | Moody et al. ................ 707/511 |
| 5,893,908 | A | * | 4/1999 | Cullen et al. .................... 707/5 |
| 5,982,931 | A | | 11/1999 | Ishimaru ..................... 382/218 |
| 6,061,697 | A | * | 5/2000 | Nakao ......................... 715/229 |
| 6,163,784 | A | * | 12/2000 | Taguchi ....................... 715/255 |
| 6,324,555 | B1 | * | 11/2001 | Sites ........................... 715/234 |
| 6,560,620 | B1 | | 5/2003 | Ching ......................... 707/511 |
| 7,065,237 | B2 | * | 6/2006 | Murakami ................... 382/137 |
| 7,260,773 | B2 | * | 8/2007 | Zernik ......................... 715/229 |
| 7,392,471 | B1 | * | 6/2008 | Ford et al. ................... 715/234 |
| 7,502,995 | B2 | * | 3/2009 | Takagi et al. ................ 715/234 |
| 2002/0133515 | A1 | | 9/2002 | Kagle et al. ................. 707/511 |
| 2003/0101164 | A1 | | 5/2003 | Pic et al. ........................ 707/1 |

(Continued)

OTHER PUBLICATIONS

W. Miller & E.W. Meyers, "A File Comparison Program", Software Practice and Experience, 15(11), Nov. 1985, pp. 1025-1040.
W. Tichy, "The String-to-String Correction Problem with Block Moves", ACM Transactions on Computer Systems, 2(4), Nov. 1984, pp. 309-321.
P. Heckel, "A Technique for Isolating Differences Between Files", Communication of the ACM, 21(4), Apr. 1978, pp. 264-268.
N.H. White and K.H. Bennett, "PRTDS—A Pascal Run-Time Diagnostics System" John Wiley & Sons, Ltd., 1985, approx. pp. 1040.

*Primary Examiner*—Laurie Ries
(74) *Attorney, Agent, or Firm*—Nelson Adrian Blish

(57) ABSTRACT

A system and methods for comparing graphic elements in a changed document to those in a reference document is described. Attributes of selected graphic elements are first adjusted before comparing so that comparing does not identify certain document changes.

24 Claims, 22 Drawing Sheets

U.S. PATENT DOCUMENTS

| | | | |
|---|---|---|---|
| 2004/0075699 A1 | 4/2004 | Franchi et al. | 345/860 |
| 2004/0085354 A1* | 5/2004 | Massand | 345/751 |
| 2005/0039116 A1* | 2/2005 | Slack-Smith | 715/511 |
| 2005/0157170 A1* | 7/2005 | Morishima | 348/161 |
| 2006/0174209 A1* | 8/2006 | Barros | 715/764 |
| 2006/0236258 A1* | 10/2006 | Othmer et al. | 715/774 |
| 2007/0061384 A1* | 3/2007 | Harrington et al. | 707/203 |
| 2007/0079236 A1* | 4/2007 | Schrier et al. | 715/517 |

* cited by examiner

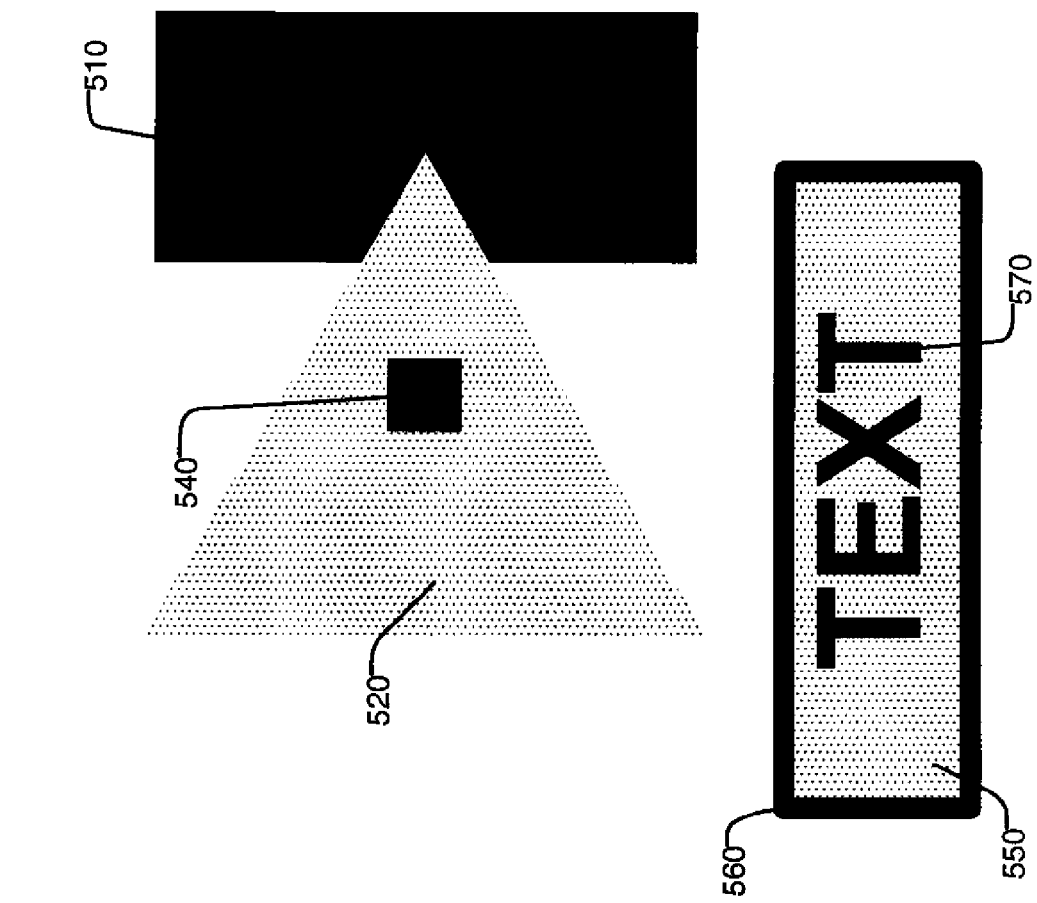
FIG. 5

FIG. 10

| Step | Step Action | Element Id | From Document | Add Location | Additional Processing Attributes | Type | Hash Value | Additional Processing Outcomes | Original Trapping Attributes |
|---|---|---|---|---|---|---|---|---|---|
| 1A | Delete | 501 | 1 | | | Image | 1 | | |
| 1B | Delete | 510 | 1 | | | Path | 2 | | Related Elements = 510,520 |
| 1C | Derived Delete | 611 | 1 | | | Trap Path | N/A | | Related Elements = 510,520 |
| 1D | Derived Delete | 612 | 1 | | | Trap Path | N/A | | |
| 1E | Add | 802 | 2 | Before 810 | Trap | Path | 8 | 1303 generated | |
| 1F | Add | 810 | 2 | Before 520 | Trap | Path | 2 | 1311 and 1312 generated | |
| 1G | No Action | 520 | 1 | | | Path | 3 | | |
| 2A | N/A | 621 | 1 | | Adjust Clipping Path | Trap Path | 8 | Adjusted to 1321 | Related Elements = 520,540 |
| 2B | Add | 830 | 2 | Before 540 | Trap | Path | 9 | 1322 generated | |
| 2C | No Action | 540 | 1 | | | Path | 4 | | |
| 3A | No Action | 550 | 1 | | | Path | 5 | | |
| 4A | Derived Delete | 655 | 1 | | | Trap Path | N/A | | Related Elements = 550,560 |
| 4B | Delete | 560 | 1 | | | Path | 6 | | |
| 4C-F | N/A | 665A-D | 1 | | Adjust Clipping Path | Trap Paths | N/A | No Change | Related Elements = 550,570 |
| 4G | Add | 860 | 2 | Before 570 | Trap | Path | 6 | 1355 generated | |
| 4H | No Action | 570 | 1 | | | Path | 7 | | |

| Display Order | Element Id | Selected Element Attributes | | Selected Production-Modified Attributes | |
|---|---|---|---|---|---|
| 1 | 802 | Type = Path | Stroke = None, Fill = Dark | | |
| 2 | 810 | Type = Path | Stroke = None, Fill = Dark | Clipping Path = CP1A | |
| 3 | 520 | Type = Path | Stroke = None, Fill = Light | | Related Elements = 621 | Screen = S2 |
| 4 | 621 | Type = Path | Stroke = None, Fill = Medium | Clipping Path = CP2 | Trap | Related Elements = 520,540 |
| 5 | 830 | Type = Path | Stroke=None, Fill=Dark | | |
| 6 | 540 | Type = Path | Stroke=None, Fill=Dark | | Related Elements = 621 |
| 7 | 550 | Type = Path | Stroke=None, Fill=Light | | Related Elements = 665A-D |
| 8 | 860 | Type = Path | Stroke = Dark, Fill = None | Stroke Width = Wide | |
| 9-12 | 665A-D | Type = Path | Stroke = None, Fill = Medium | | Trap | Related Elements = 550,570 |
| 13 | 570 | Type = Text | Stroke = None, Fill = Dark | | Related Elements = 665A-D |

FIG. 12

| Display Order | Element Id | Selected Element Attributes | | Selected Production-Modified Attributes | |
|---|---|---|---|---|---|
| 1 | 802 | Type = Path | Stroke = None, Fill = Dark | | Related Elements = 1303 |
| 2 | 1303 | Type = Path | Stroke = None, Fill = Medium | | Related Elements = 802,520 |
| 3 | 810 | Type = Path | Stroke = None, Fill = Dark | Clipping Path = CP1A | |
| 4 | 1311 | | | | Related Elements = 1311,1312 |
| 5 | 1312 | | | | Related Elements = 520,810 |
| 6 | 520 | Type = Path | Stroke = None, Fill = Light | | Related Elements = 520,810 |
| 7 | 1321 | Type = Path | Stroke = None, Fill = Medium | Clipping Path = CP2A | Related Elements = 621,1303,1311, 1312 |
| 8 | 1322 | | | Trap | Related Elements = 520,540 |
| 9 | 830 | Type = Path | Stroke=None, Fill=Dark | Trap | Related Elements = 520,830 |
| 10 | 540 | Type = Path | Stroke=None, Fill=Dark | | |
| 11 | 550 | Type = Path | Stroke=None, Fill=Light | | Related Elements = 665A-D,1355 |
| 12 | 1355 | | | Trap | Related Elements = 550,860 |
| 13 | 860 | Type = Path | Stroke = Dark, Fill = None | Stroke Width = Wide | Related Elements = 1355 |
| 14-17 | 665A-D | Types = Path | Stroke = None, Fill = Medium | Trap | Related Elements = 550,570 |
| 18 | 570 | Type = Text | Stroke = None, Fill = Dark | | Related Elements = 665A-D |

FIG. 14

SYSTEMS AND METHODS FOR COMPARING DOCUMENTS CONTAINING GRAPHIC ELEMENTS

REFERENCE TO RELATED APPLICATION

This application is a continuation in part of U.S. patent application Ser. No. 11/129,349 entitled "SYSTEM AND METHODS FOR COMPARING GRAPHIC DOCUMENTS", filed May 16, 2005, now U.S. Pat. No. 7,536,636 which is a continuation in part of U.S. patent application Ser. No. 11/114,078 entitled "SYSTEM AND METHODS FOR COMPARING GRAPHIC DOCUMENTS", filed Apr. 26, 2005, now U.S. Pat. No. 7,555,712 both of which are hereby incorporated by reference herein.

TECHNICAL FIELD

This invention relates to comparing documents comprised of graphic elements to identify similarities and/or differences between the documents being compared. Some embodiments of the invention facilitate merging graphic elements from documents

BACKGROUND

Document creation and production (e.g. printing) often involves making changes to a document. The changes may result from iteration in the content creation phase, corrections identified after the content creation phase or requirements of the production phase. Inevitably, different versions of a document result. Persons working with different versions of documents desire tools for identifying differences between versions. In some circumstances, there is a desire to merge some content from one version of a document with other content from another version of the document.

Prior art for accomplishing this is well known. Microsoft® Word® 2003 software includes features capable of identifying differences between documents consisting primarily of textual content. For example, two documents, having some common textual content, can be compared to identify components common and unique to each document. Furthermore, one document can be merged with the other, based on information obtained during the comparison.

In the graphic arts field however, documents often comprise content including combinations of text, photographic images and artwork.

Microsoft® Word® 2003 provides only limited support for comparing and merging non-text elements. For example, a Microsoft® Word® 2003 document containing a combination of text, inserted images and artwork (drawn with the integrated drawing function provided by Microsoft® Word® 2003) can be compared. The comparison does not recognize changes that involve substituting an inserted image file with a file having a different filename corresponding to a modified form of the original image. Similarly, the comparison does not recognize certain changes in the drawn artwork (e.g. changing the dimensions of a drawn rectangle). Other changes in artwork, such as changing the fill color of a drawn rectangle cause the entire drawing frame to be recognized as different during a comparison.

Other document creation software, such as Adobe® FrameMaker® 7.0 exhibits similar behavior. The user documentation for Adobe® FrameMaker® 7.0 indicates that artwork objects placed in an anchored frame, within the text flow of an Adobe® FrameMaker® 7.0 document, are compared. If the objects are different, or if they are in different positions (for example, if they have a different front-to-back order), the entire anchored frame is marked as changed. Experimentation reveals that some changes to objects, such as resizing, are not recognized during a comparison. Similarly, changes to artwork inserted as an encapsulated PostScript® (.eps) file, are not recognized during a comparison.

Document interchange formats can represent documents having mixed content. Some document interchange formats, such as TIFF and CT/LW, normalize content as raster pixels. An advantage of this format is that conversion to a production format is relatively simple, since most display and printing devices are raster-oriented. A disadvantage of this format is that information about the structure of the content is lost during the rendering process that produces raster pixels.

There exists software tools for comparing raster documents. Such tools may compare raster pixels to determine differences. Typically, these differences are displayed visually by highlighting individual pixels in a contrast color or by highlighting a region surrounding any changed pixels. Merging two raster documents can be accomplished by manually selecting pixels from each document. This is not practical where significant differences occur. Automation is also difficult since there is little context information upon which to determine the document to select for each pixel. An example of a tool that compares raster images is Artwork Systems ArtPro™ 6.5, which provides an "export differences" function that operates to compare two jobs. When calculating the differences, ArtPro™ scans the job in pixels, it does not look at vector information.

Other document interchange formats, such as Adobe® PostScript® and Adobe® Portable Document Format (PDF), represent content as vector elements. A document includes page description language statements that define vector-based graphic elements (e.g. text, images and symbol clipping paths). The language describes elements with attributes identifying their characteristics and their layout on a page. The language also describes the order in which each element is to be displayed on a page. In this context, vector format has advantages and disadvantages opposite those of raster format.

Adobe® Acrobat® provides a document comparison function with three levels of analysis detail. Experiments, using PDF files created by printing from modified versions of an Adobe® Illustrator® document suggest that pixel comparison is being performed. For example, comparing with the most detailed level of analysis, Acrobat® can detect a single pixel variation in an imported image. This is highlighted visually as a path surrounding the vicinity of any changed pixels. Similarly, changes made to a PDF file using a PDF editor application (e.g. Enfocus Pitstop™) to increase the size of a path graphic element (e.g. a triangle shape) are detected by Acrobat® and visually highlighted as changes in a small portion of the boundary of the path graphic element. The entire path graphic element is not highlighted as having been changed.

Enfocus Pitstop™ allows a user that is editing graphic elements in a PDF document to identify differences based on session logs that track edits made to graphic elements within that document.

Creo® Seps2Comp™ software examines attributes of graphic elements from multiple pages of a single document. Each page of the document represents a different printing colorant, generated from a composite-color document during the step of creating the document interchange format. Seps2Comp™ examines attributes of graphic elements to infer the composite graphic element based on similarity between attributes of the color-separated graphic elements. Similar elements from separate pages can be composited by combining their colorants and tonalities from separate pages into a single graphic element on a single page. Seps2Comp™ only operates in an automated fashion. In some situations, it can inappropriately declare graphic elements as being similar or different. The algorithms and rules for determining similarity are not ideal and no method for compensating for mistakes exists.

Thus, there is an unfulfilled need for systems and methods for comparing documents containing a variety of types of elements. Printing of packaging materials is one field where the needs are acute. Two factors exacerbate the acuteness. First, packaging documents are often produced with variations to suit needs of different regions or markets. The variations are usually included in the original native document format and may be manifested as separate layers that can be selectively enabled prior to producing the document interchange format for a specific region or market. Thus, a number of different documents may be printed from each original document. The multiple documents can include a significant number of common graphic elements.

Second, during the print production phase, a packaging converter will invest significant time and skill in preparing a document for printing. This can include trap-processing, which adds graphic elements, at boundaries between graphic elements to improve the quality of the printed material. It can also include halftone screen assignment, which specifies the nature of the rendered pixels, on a graphic element basis, to improve the quality of the printed material. It can also include editing the graphic elements to make corrections in content, such as fixing spelling mistakes. Other print production processing activities can also occur.

Packaging converters, faced with two or more significantly common documents, cannot afford to absorb the significant costs associated with duplicating production activities to account for regional variations and last-minute content changes. Furthermore, the process for producing printing plates is time-consuming and packaging converters require tools for visualizing the differences between documents prior to making plates. Visualizing differences at the graphic element level, instead of the pixel level, is important. In many cases, regional variations or content changes affect only specific plates corresponding to specific colors (usually black and spot colors).

In some scenarios where changes are made to a document, content elements that are unchanged will appear to be changed when compared with the original document. As an example, changes in production content (e.g. marks, scales, job information) may cause the page size and/or position to change. Positions for content elements can be affected by such changes since their position may be specified relative to the page's size and position, which may have changed. However, the printer may only be interested in identifying explicit changes to content and not implicit changes caused by indirect actions.

As an another example, content elements produced from a creative application (e.g. encapsulated PostScript) can specify content position relative to a media box defined by the extent of configured elements. During a content revision that only adds one content element, as an example, the media box change may result in a change in the position of otherwise unchanged content.

Also, a printer may not be interested in having a comparison identify other changes, such as changes that affect content element attributes but without changing the element's appearance. As an example, a change in an element's color space and corresponding color values will result in attribute changes but the different color attributes may represent visually similar colors.

In some scenarios, content display order can be changed intentionally or accidentally. This can result in content attributes remaining unchanged but the visual appearance may change as a result of the change in painting order. For example, an element painting early in the display may be partially obscured by another element painting later. Hence, a change that causes the element to paint later may be worth identifying during a comparison. If the printer's intent is to merge changed content into the reference document it may be desirable to automatically compensate for changes that only affect an element's display order.

SUMMARY OF THE INVENTION

This invention provides systems and methods for comparing documents. Some revisions made to a reference document can cause some of the reference graphic elements to be identified as changed elements in a comparison of the documents wherein identifying the changed elements would produce an undesirable result. The invention compensates for some of these undesirable results.

In some embodiments, elements of a changed document are adjusted, prior to a comparison, to compensate for a change in the document that would cause some of the elements of the reference document to be undesirably identified as changed in the comparison.

In other embodiments, for changes that only affect the relative display order of otherwise unchanged elements, compensation during merging of changed elements into the reference document can occur. In one preferred embodiment, selecting the latest relative display order for such an element is preferred as a merging option.

Preferred embodiments compare vector format documents such as documents conformant with the Adobe® Portable Document Format (PDF) specification. A system according to one embodiment of the invention includes an Adobe® Acrobat® plug-in software module that includes a document comparator and a document merger. The Document Comparator examines attributes of selected graphic elements in a first document and a second document to generate an edit script that identifies graphic elements that would need to be deleted from the first document and graphic elements that would need to be added to the first document to make the first document like the second document. The selected graphic elements may correspond to graphic elements created during the content creation phase.

Examined graphic elements may be compared using rules that allow graphic elements with only minor differences in attribute values to be identified as equivalent. The Document Merger applies the edit script to the first document to produce a merged document that is similar to the second document. Applying the edit script causes deletion of graphic elements unique to the first document and addition of graphic elements unique to the second document. Because of the selection criteria and rules applied by the Document Comparator, graphic elements from the first document that are sufficiently similar to those in the second document may be preserved. Graphic elements from the first document that were not selected for comparison can also be preserved. Preservation of graphic elements is particularly advantageous when those graphic elements were affected by significant investment of time and skill during a production phase.

An optional Comparison Visualizer applies portions of the edit script, in conjunction with the first and second documents, to produce a layered view with each layer showing certain graphic elements. One exemplary layered view presents graphic elements in three layers. One layer contains graphic elements common to both documents. Another layer contains graphic elements unique to the first document. A third layer contains graphic elements unique to the second document. Controls are provided to alter the visual appearance of identified graphic elements to facilitate visualization of similarities and differences amongst graphic elements. The Comparison Visualizer also provides controls to select one or more graphic elements and override the actions, corresponding to the selected graphic elements, in the edit script.

Thus, user-defined modifications of the automatically generated edit script can be made and the modified edit script re-applied to produce a desired merged document result. Optional Additional Document Processing components examine graphic elements in the merged document to perform additional processing. As an example, a trap-processing engine processes the merged document to adjust trap graphic elements preserved from the first document and add trap graphic elements. Both may be required by the addition of graphic elements from the second document.

These and other aspects of the invention and features of embodiments of the invention are illustrated in greater detail in the detailed description.

BRIEF DESCRIPTION OF DRAWINGS

In drawings which illustrate non-limiting embodiments of the invention:

FIG. 5 is a diagram illustrating the rendered appearance of a first document, after content creation;

FIG. 10 is a data structure diagram illustrating an edit script capable of merging a second document into a first document;

FIG. 12 is a data structure diagram illustrating the document corresponding to FIG. 11;

FIG. 14 is a data structure diagram illustrating the document corresponding to FIG. 13;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
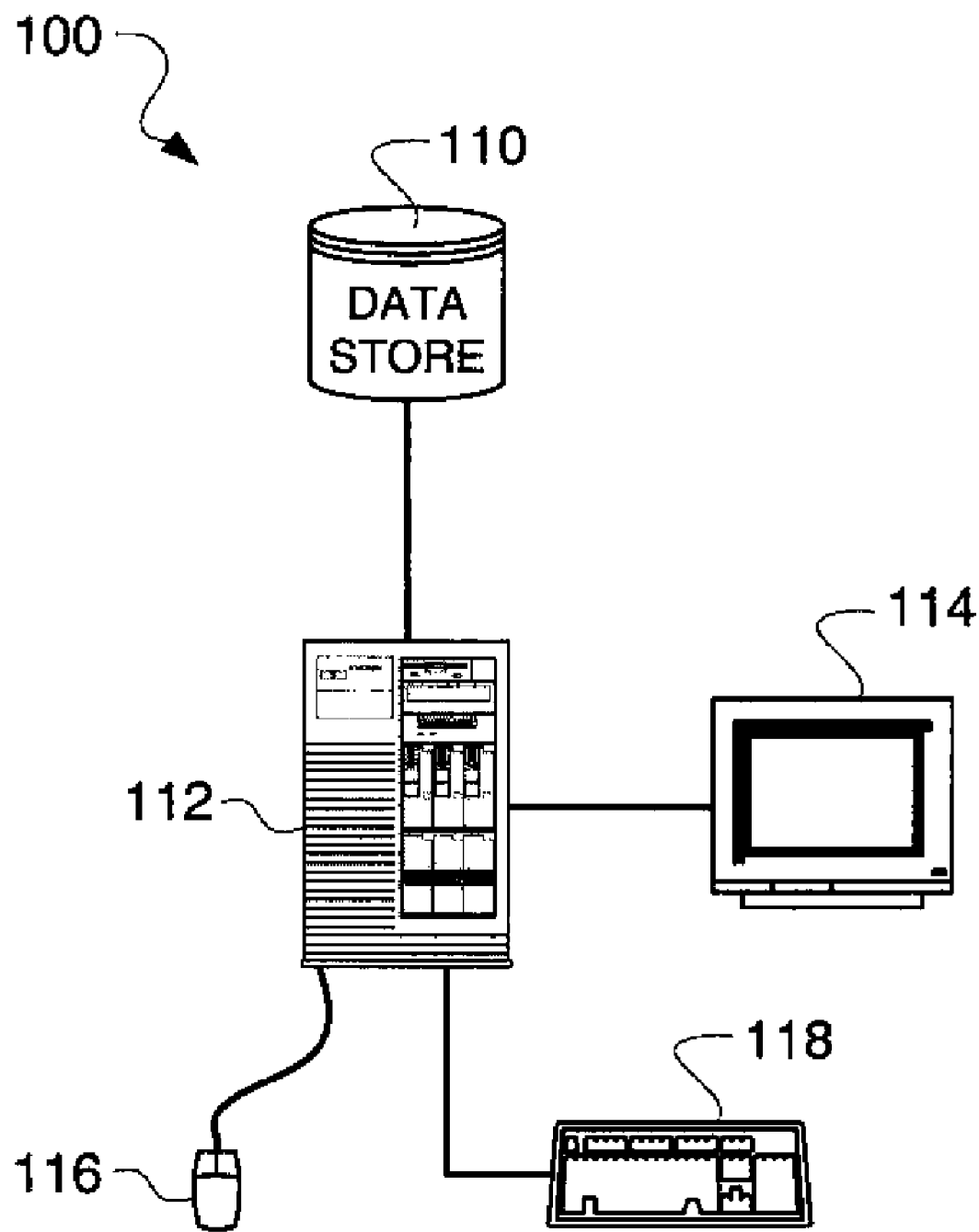
FIG. 1 is a schematic diagram representing a computer system environment according to one embodiment of the invention.

FIG. 1 is a schematic diagram of a computer system 100 according to an embodiment of the invention. Computer system 100 has a processing unit 112 that operates a software embodiment of the invention. Processing unit 112 has access to a data store 110, which is a computer-accessible memory system providing temporary and permanent storage of data. Data store 110 can be part of computer system 100 or can be provided in another computer system accessible to processing unit 112. Additionally, the data store 110 may be a distributed data storage system having a plurality of separately located computer-accessible memories communicatively connected. The phrase "communicatively-connected" is intended to refer to any type of connection, whether wired or wireless, in which data may be communicated. Processing unit 112 has a user interface including one or more input devices and output devices. For example, output devices can include a graphical monitor 114 suitable for presentation of a GUI, and input devices can include a mouse 116 and a keyboard 118.

The remainder of the description describes operation of embodiments of the invention by illustrating:

A method for automatically comparing a first document and a second document to produce a merged document while preserving production phase investment in graphic elements of the first document;

A method for automatically determining graphic element similarity and an edit script consistent with the merging method above;

An example illustrating the methods above; and

Methods for visually comparing the common and unique graphic elements among two documents that also allow a user to modify an edit script consistent with the merging method above.

Automatic Merging

Figure 2:
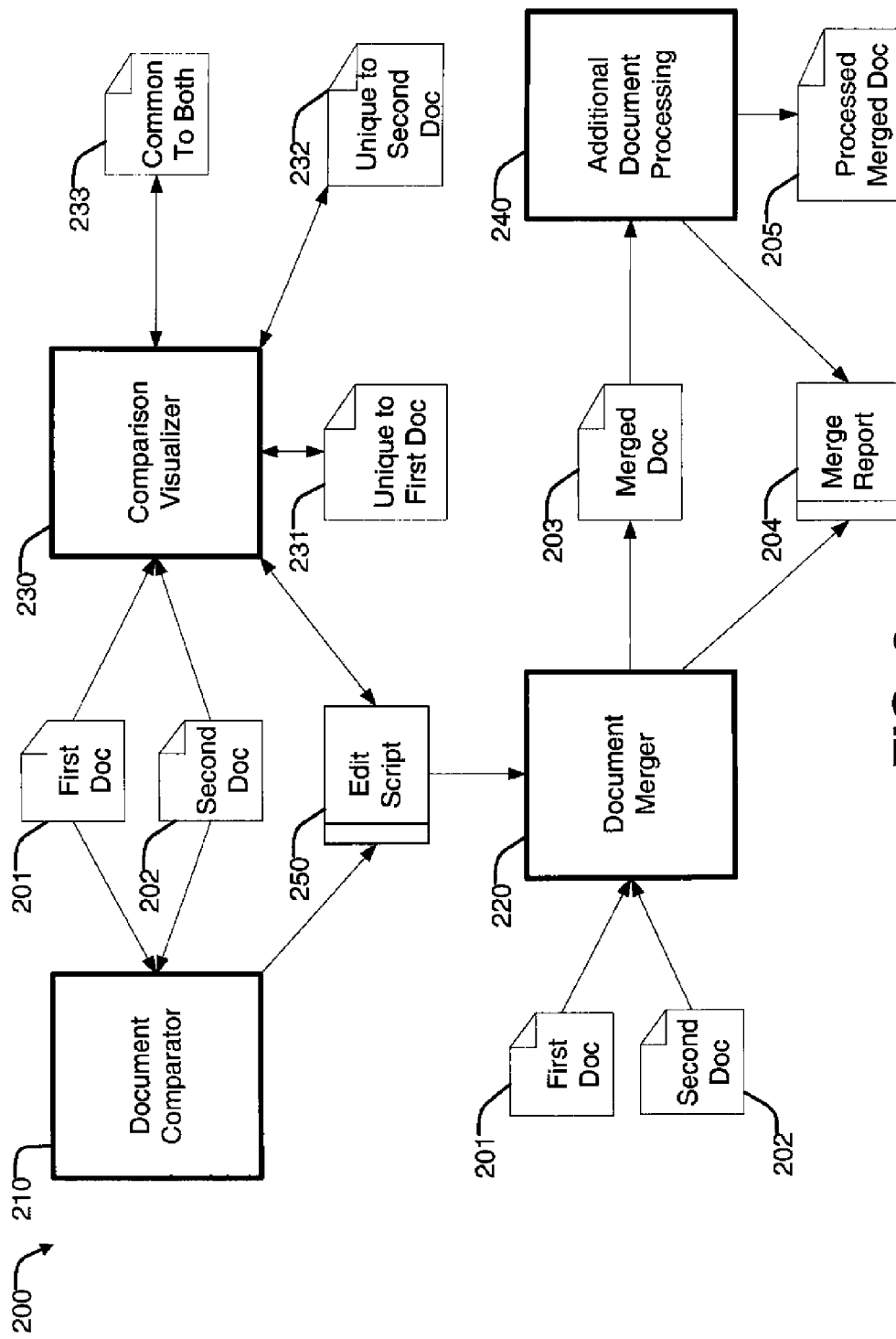
FIG. 2 is a block diagram illustrating the functional components of a system according to one embodiment of the invention.

FIG. 2 is a block diagram illustrating the functional components of computer system 100 according to an embodiment of the invention. A first document 201 includes page description data, which defines the layout of one or more pages to be printed using a page description language. The page description data defines graphic elements such as text, images, and artwork (e.g. paths, shadings and blends). Graphic elements have attributes that relate to their visual appearance (e.g. clipping path, stroke, fill, and font type). A second document 202 is similarly constructed. For illustrative purposes, a contrived history of example first and second documents is outlined below.

In this example, documents 201 and 202 have a common origin, having been produced during a first content creation phase by an artist, whose goal was to produce a particular visual intent. Graphic elements defined during a content creation phase are considered "content graphic elements". First document 201 was modified during a first production phase, following the first content creation phase. The purpose of the modifications was to improve the quality of the printed result or to facilitate some production process. During the production phase, graphic element attributes in first document 201 were modified (e.g. halftone screens were assigned or modified). Trap graphic elements were also added to first document 201 during the production phase. These production phase activities involved some labor-intensive activities. Graphic elements, such as trap graphic elements, added during the production phase are considered "production graphic elements". Graphic element attributes modified during the production phase are considered production-modified graphic element attributes. First document 201 was ready to print from a production perspective. However, the content of first document 201 is no longer suitable to print.

Second document 202 was created during a second content creation phase that involved making revisions to first document 201 to reflect new or changed content. The revised content can include corrections or changes in artistic intent. Regardless, a second production phase begins, corresponding to processing of second document 202, which has the goal of printing second document 202 while preserving as much first production phase investment in first document 201 as possible. Investment in the production phase of first document 201 can be preserved where it is independent of content revised in second document 202.

According to one embodiment of the invention, documents are PDF documents produced, for example, by printing from a document creation application using Adobe® PDF Writer. In such an embodiment, some or all of the processing parts of system 200 can be encapsulated as software plug-ins compatible with Adobe® Acrobat® software. For illustrative purposes, the remainder of this description is based on PDF documents and Adobe® Acrobat® plug-in architecture. Other embodiments can include other software architecture models and document formats. Alternative document formats are compatible with the invention if the document format can be interpreted to form a display-ordered list of graphic elements.

"Display-ordered" means that, when rendered by an image processor, the document's graphic elements are displayed in a specified order. Display ordering is important when graphic elements overlap with one another. Image processors can choose to display later-ordered graphic elements using a knockout or overprint technique. A knockout technique results in a later-ordered graphic element obscuring earlier ordered graphic elements in regions where they overlap. An overprint technique results in colorants from overlapping graphic elements combining in regions where they overlap. The resultant combination can depend, at least in part, on the relative ordering of the contributing graphic elements. Documents referenced in FIG. 2 can exist as files in data store 110 or can exist as data streams or other formats compatible with processing unit 112.

Figure 3:
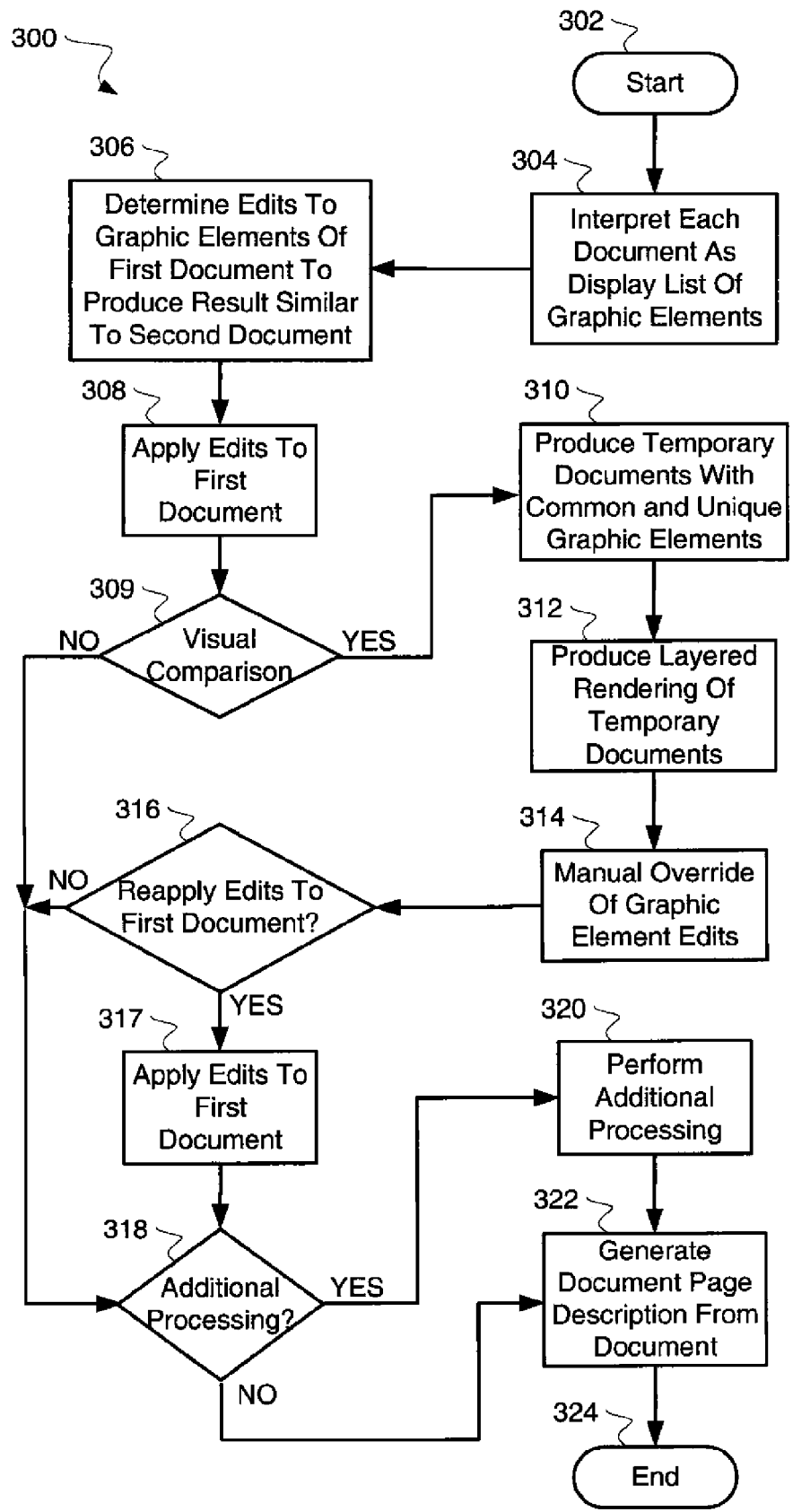
FIG. 3 is a flow chart diagram illustrating a method for processing documents according to one embodiment of the invention.

FIG. 3 is a flow chart diagram describing a basic method for processing graphic documents according to a preferred embodiment of system 200. The method begins at block 302 with a user interacting with a GUI provided by document comparator 210 via input devices 116 or 118 and monitor 114.

Some preliminary production phase processing, known as refining, can occur at or prior to the start of the method so that equivalent graphic elements are consistently defined in the two documents. As an example, a production facility can convert a content phase document to the PDF format from some other page definition format (e.g. native document creation format or PostScript® format). In addition, the syntax and/or the semantics of the page description data may have been altered. Syntax changes can involve representing a document utilizing a different version of the page description language having desirable features. Semantic changes, manifested as changes to graphic elements and their attributes, can correspond with adopting production policies (e.g. always overprint, re-sampling images to a specific resolution, converting filled path graphic elements into separate stroke and fill path graphic elements).

In block 304, document comparator 210 interprets the page description data from first document 201 and second document 202 to produce display-ordered graphic element list (display list) versions of each of the documents. Methods for interpreting page description data into a display list are well known in the art. Unless otherwise specified below, subsequent references to first document 201 and second document 202 pertain to the display list versions of those documents.

In block 306, document comparator 210 examines selected (see below) graphic elements defined by first document 201 and second document 202 to produce an edit script 250 that is capable of producing merged document 203 which is similar in appearance to second document 202 but preserves some graphic elements from first document 201. Other embodiments of the invention can include edit data in other forms that can be utilized to provide a similar result to edit script 250.

The method continues at 308, document merger 220 applies edit script 250 to first document 201. One result is merged document 203, with graphic elements not selected for comparison and those identified as similar in the two documents preserved from first document 201. Further, graphic elements unique to first document 201 are deleted, and graphic elements unique to second document 202 are added, preserving their relative order from second document 202. Document merger 220 can set attributes on preserved graphic elements indicating the need to re-examine any production-modified attributes.

Document merger 220 also examines production graphic elements present in first document 201 to determine whether to delete them. Rules can be established to govern this, based on edit script 250 and other information. As an example, trap graphic elements are deleted from first document 201 if either of the content graphic elements referenced by the trap graphic element are deleted, since the boundary between these graphic elements no longer exists. Conversely, a trap graphic element is preserved in first document 201 if both of its referenced graphic elements are preserved. Other types of production graphic elements and other scenarios can be accommodated utilizing additional or different rules.

Block 308 completes with document merger 220 producing merge report 204, including information about graphic elements affected by the merge process. Information in merge report 204 can include summary or detail information about graphic elements affected by the merge or can identify impacts to the production process corresponding to the affected graphic elements. For example, merge report 204 can identify which printing colorants are unaffected by the merge, so that previously-created printing plates corresponding to one or more colorants can be reused. Merge report 204 can be saved in data store 110 or can be presented in a GUI via monitor 114.

Proceeding at block 309, a decision is made whether to perform a visual comparison of the documents. This can be based on a user preference or in response to a query provided in document merger 220 GUI. If the decision is yes, a visual comparison is performed starting with block 310 as described below. If the decision is no, the method continues at block 318.

Proceeding at block 318, a decision to perform additional processing is made. This can be based on a user preference or in response to a query provided in document merger 220 GUI. Additional document processing 240 provides this processing. If the decision is no, block 322 is performed wherein document merger 220 converts merged document 203 into its page description data format suitable for use by other production applications. Document merger 220 can save merged document 203 to data store 110 and/or can keep it available in processing unit 112 for use by other applications.

If the decision at block 318 is yes, block 320 is performed. Additional document processing 240 can include trap-processing or any other processing relevant to the production phase. In one embodiment of the invention, additional document processing 240 includes two additional trap-processing steps. First, preserved trap graphic elements are re-examined to determine whether any added or deleted graphic elements affect the clipping path of the preserved trap graphic elements. As an example, an added graphic element, situated adjacent to or overlapping a trap graphic element, can cause trapping rules, stored in association with the preserved trap graphic elements, to clip part of the trap graphic element along the path of the added graphic. In general, trapping rules can be quite complex and thus a variety of changes to one or more existing trap graphic elements can result from an added graphic element. Second, trapping rules can be applied to any added content graphic elements where these elements become adjacent to or overlap other content graphic elements in merged document 203. Additional processing 240 produces processed merged document 205 from merged document 203.

Additional document processing 240 next updates or produces an additional merge report 204 that provides information about the trap-processing and its effects on graphic elements. Next, at block 322, additional document processing 240 converts processed merged document 205 into its page description data format and saves it to data store 110.

Automatic Edit Script Creation

Figure 4:
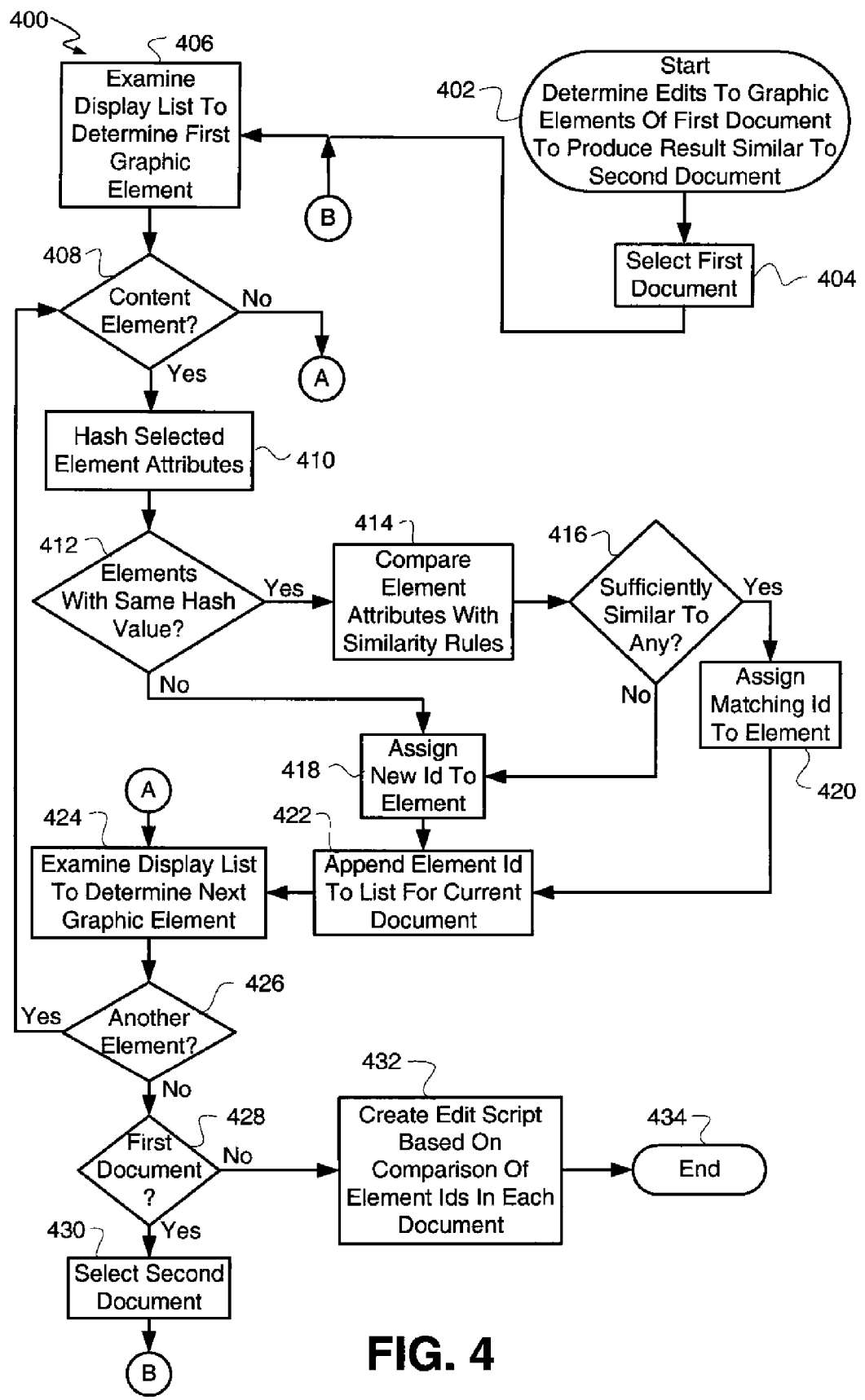
FIG. 4 is a flow chart diagram illustrating a method for comparing graphic elements amongst two documents to produce an edit script capable of merging the documents.

FIG. 4 is a flow chart diagram describing a method that may be used by document comparator 210 to produce edit script 250. The method starts in block 402 with a first goal of producing two ordered lists of unique identifiers corresponding to the selected graphic elements in first document 201 and second document 202, respectively. The identifiers are unique amongst the graphic elements defined by both documents. According to the invention, and described in detail below, a graphic element is similar to another graphic element (i.e. they have the same identifier), if compared attributes are similar, within defined accuracy, to the corresponding attributes of the other graphic element.

The method proceeds at block 404 by selecting first document 201 as the current document. Next, block 406 identifies the first graphic element to be displayed by the current document as the current graphic element.

Proceeding at block 408, the graphic element selection criteria are applied. According to one embodiment of the invention, selection criteria identify only content graphic elements, consistent with the goal of preserving production phase investment in first document 201. As an example, corresponding to the method of FIG. 4, trap and other production graphic elements can be generated with an attribute identifying them as production graphic elements. The selection criteria thus includes testing for the absence of the production graphic element attribute. Other criteria, based on this or combinations of other attributes associated with the graphic elements can be established to identify other categories of graphic elements. As an example, a criteria that selects all graphic elements can be used to determine differences between both content and production graphic elements in documents that have both been subjected to production phase processing.

At block 408, if the current graphic element is not content, the method proceeds to block 424. Otherwise, the method proceeds to block 410.

In the illustrated embodiment, comparisons between graphic elements are facilitated by computing a hash value from attributes of the graphic elements. Other comparison methods may be used in other embodiments of the invention. In block 410 selected attributes of the current graphic element are processed using a hashing algorithm. The hashing algorithm takes variable-length data, corresponding to selected graphic element attributes, and derives fixed-length data, or a hash value from the variable-length data. The attributes and hashing algorithm are chosen so that graphic elements having some similarities produce the same hash value.

Next, in block 412, the set of previously hashed graphic elements is examined. If there is no hash list, identified by a hash value corresponding to the hash value of the current graphic element, a new hash list is created in association with the current graphic element and the method proceeds to block 418 where the current graphic element is associated with the next unique identifier. As an optimization, when processing graphic elements from the first document, the method can always proceed to block 418 since one can assume that each graphic element in the first document is unique.

Otherwise, the method proceeds to block 414 where the current graphic element is associated with an existing hash list identified by the current graphic element's hash value. Next, a detailed comparison of the current graphic element's attributes is performed with each graphic element, associated with the hash list, to determine if any are sufficiently similar to be considered equivalent to one another.

Rules define the meaning of "sufficiently similar". Tables 1-5 exemplify rules according to a preferred embodiment of the invention. These rules aim to ignore visually imperceptible differences between similar graphic elements. Other types of rules, involving graphic element attributes and other criteria, can also be utilized in accordance with the invention.

For example, a rule can be established to ensure that a graphic element selected from a document cannot be sufficiently similar to another graphic element from the same document. If two graphic elements from the same document are otherwise sufficiently similar this can be brought to the attention of the user as an unexpected result. Some embodiments of the invention permit a user to fine tune the rules for evaluating the equivalence of graphic elements or to select between different groups of rules for evaluating the equivalence of graphic elements.

TABLE 1

Example Path Graphic Element Similarity Rules

| Attribute | Accuracy |
|---|---|
| Clipping path control points | 0.06 pts |
| Painted colorants | 0.01 |
| Control points (default user space) | 0.06 pts |
| Paint operation | Equivalent |
| Stroke width (if and only if{iff} stroked) | 0.06 pts |
| Line join (iff stroked) | Equal |
| Miter limit (iff stroked) | .1% of min scale |
| Line cap (iff stroked) | Equal |
| Dash pattern (iff stroked) | 0.06 pts |

TABLE 2

Blend Graphic Element Similarity Rules

| Attribute | Accuracy |
|---|---|
| Clipping path control points | 0.06 pts |
| Number of path elements | Equal |

TABLE 3

Shading Graphic Element Similarity Rules

| Attribute | Accuracy |
|---|---|
| Clipping path control points | 0.06 pts |
| Shading dictionary | Equal |
| CTM delta transform | .1% of min scale |
| CTM offset | 0.03 pts |

TABLE 4

Example Text String Graphic Element Similarity Rules

| Attribute | Accuracy |
|---|---|
| Clipping path control points | 0.06 pts |
| Painted colorants | 0.001 |
| TRM delta transform | .1% of min scale |
| TRM offset | 0.06 pts |
| Text render mode | Equivalent |
| PostScript ® font name | Equal |
| Word spacing | $1.5 \times 10-5$ |
| Character spacing | $1.5 \times 10-5$ |
| String | Equal |
| Line width (iff stroked) | 0.03 pts |
| Line (iff stroked) | Equal |
| Miter limit (iff stroked) | .1% of min value |
| Line cap (iff stroked) | Equal |
| Dash pattern (iff stroked) | 0.03 pts |
| Sub-paths | Recursive application of path comparison |

TABLE 5

Example Image Graphic Element Similarity Rules

| Attribute | Accuracy |
|---|---|
| Clipping path control points | 0.06 pts |
| Colorants | Equal |
| CTM delta transform | .1% of min scale |
| CTM offset | 0.03 pts |
| Dimension | Equal |
| Bit depth | Equal |
| Pixel values | Equal |
| Mask type | Equal |
| Color mask (iff color masked) | Equal |
| Image mask (iff masked by position) | Recursive application of image comparison |

The single hash key method described above is suitable for attributes having discrete values. For attributes that have continuous (or a sufficiently large number of) values, it can be advantageous to quantize a value range into discrete bins so that a discrete hashing algorithm can be used. Depending on the degree of quantization and the tolerances defined by corresponding similarity rules, two graphic elements which are sufficiently similar that they should be found to be equivalent could produce different hash values using the single hash key method. To ensure that sufficiently similar elements, having these type of attributes, are identified, multiple hash values can be generated for each graphic element, based on the quantization and tolerance applied. A graphic element could thus be associated with more than one hash list. When searching for sufficiently similar graphic elements, multiple hash lists, corresponding to multiple hash values generated for a graphic element, are examined.

In a simplified example, assume that a hash value for a graphic element of the "text" type is based only on a point size attribute. Further assume that point sizes are quantized, prior to hashing, into bin numbers corresponding to point sizes from 0 to 100 in increments of 0.1 points. Further assume that text elements having point sizes within 0.06 points are "sufficiently similar" for a particular application. If a text element has a point size of 10.05, rules dictate that it is similar to other text elements whose point size values are within the range (9.99<=size<=10.11). A first hash value is generated using a first bin corresponding to the range (10.00<=size<10.10) since the text element's point size (10.05) lies within that range. A second hash value is generated using a second bin corresponding to the range (9.90<=size<10.00) since a similar text element with point size (9.99) would lie within that range. A third hash value is generated using a third bin corresponding to the range (10.00<=size<10.10) since a similar text element with point size (10.11) would like within that range. If multiple attributes requiring quantization were hashed, the number of generated hash values would increase according to the number of combinations of potentially matching bins.

The method continues at block 416 where the result of the sufficient similarity comparison is decided. If the current graphic element is not found to be sufficiently similar to any previously-processed graphic elements, the method proceeds to block 418 where the current graphic element is associated with the next unique identifier. Otherwise, at block 420, the current graphic element is associated with the unique identifier associated with the graphic element that it is sufficiently similar to.

Proceeding from block 418 or 420 to block 422, the method appends the current graphic element's identifier to the list corresponding to the current document. A list of graphic element identifiers is preferred to a list of graphic elements because such a list utilizes fewer resources from processing unit 112 during later comparisons. Proceeding to block 424, the method examines the current document to determine if another graphic element exists after the current graphic element. At block 426, if a next graphic element is found, it is identified as the current graphic element and the method proceeds to block 408. Otherwise the current graphic element is the last graphic element in the current document. In the latter case, the method proceeds to block 428 where the current document is examined to determine if it is first document 201. If yes, second document 202 is identified as the current document at block 430 and the method proceeds to block 406. Otherwise, the method proceeds to block 432, the first goal having been accomplished.

At block 432, the two lists are examined by document comparator 210 to generate an edit script 250 capable of changing the first list into the second list. Specifically, edit script 250 includes a set of graphic element actions, including: delete (from first document 201), and add (from second document 202). Finally, document comparator 210 sets attributes of certain graphic elements to indicate that these graphic elements may require additional processing.

Methods suitable for creating edit script 250 are well known in the art. An example method proceeds by:

Examining items in both lists, in order, until a common item is found.

Then, delete all items in the first list between the last common item (or start of list initially) and the new common item.

Then, add all items that are unique to the second list, between the last common item (or start of list initially) and the new common item.

Add them to the first list between the last and new common item, preserving their relative order in the second list.

Repeat until both lists have been exhausted, treating the ends of the lists as a common item.

An exemplary method, according to a preferred embodiment of the invention, uses the so-called "Longest Common Subsequence" algorithm described by W. Miller & E. W. Meyers and detailed in "A File Comparison Program", Software—Practice and Experience 15(11), November 1985, pp. 1025-1040. Other potential sources of related subject matter include: "The String-to-String Correction Problem with Block Moves", ACM Transactions on Computer Systems 2(4), November 1984, pp. 309-321; "A Technique for Isolating Differences Between Files", Communications of the ACM 21(4), April 1978, pp. 264-268.

DETAILED EXAMPLE

This section details a simple example, further illustrating the methods identified in the foregoing description. FIG. 5 is a diagram illustrating a rendering of an exemplary first document 201, immediately following the initial content creation phase. At this stage, first document 201 includes the following graphic elements, in display order:

Image 501

Rectangular path 510, having no stroke and a dark-colored fill having a clipping path CP1;

Triangular path 520, having no stroke and a light-colored fill;

Square path 540, having no stroke and a dark-colored fill;

Rectangular path 550, having no stroke and a light-colored fill;

Rectangular path 560, having a medium width, dark-colored stroke and no fill, initially part of rectangular path 550 but separated by a refining process; and Text string 570, having no stroke and a dark-colored fill.

Each graphic element has been assigned a default halftone screen S1.

Figure 6:
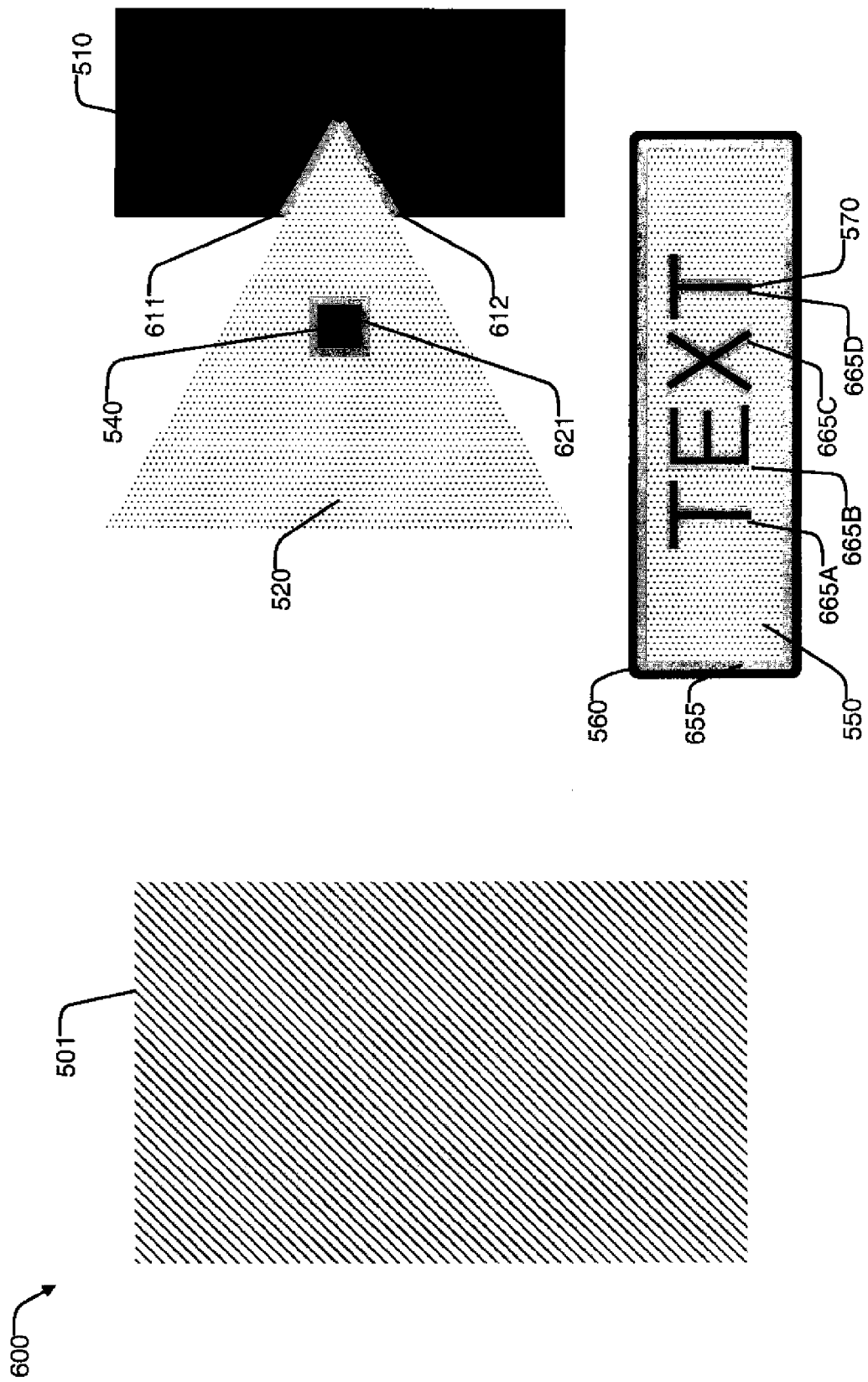
FIG. 6 is a diagram illustrating the rendered appearance of a first document, after initial production processing.
Figure 7:
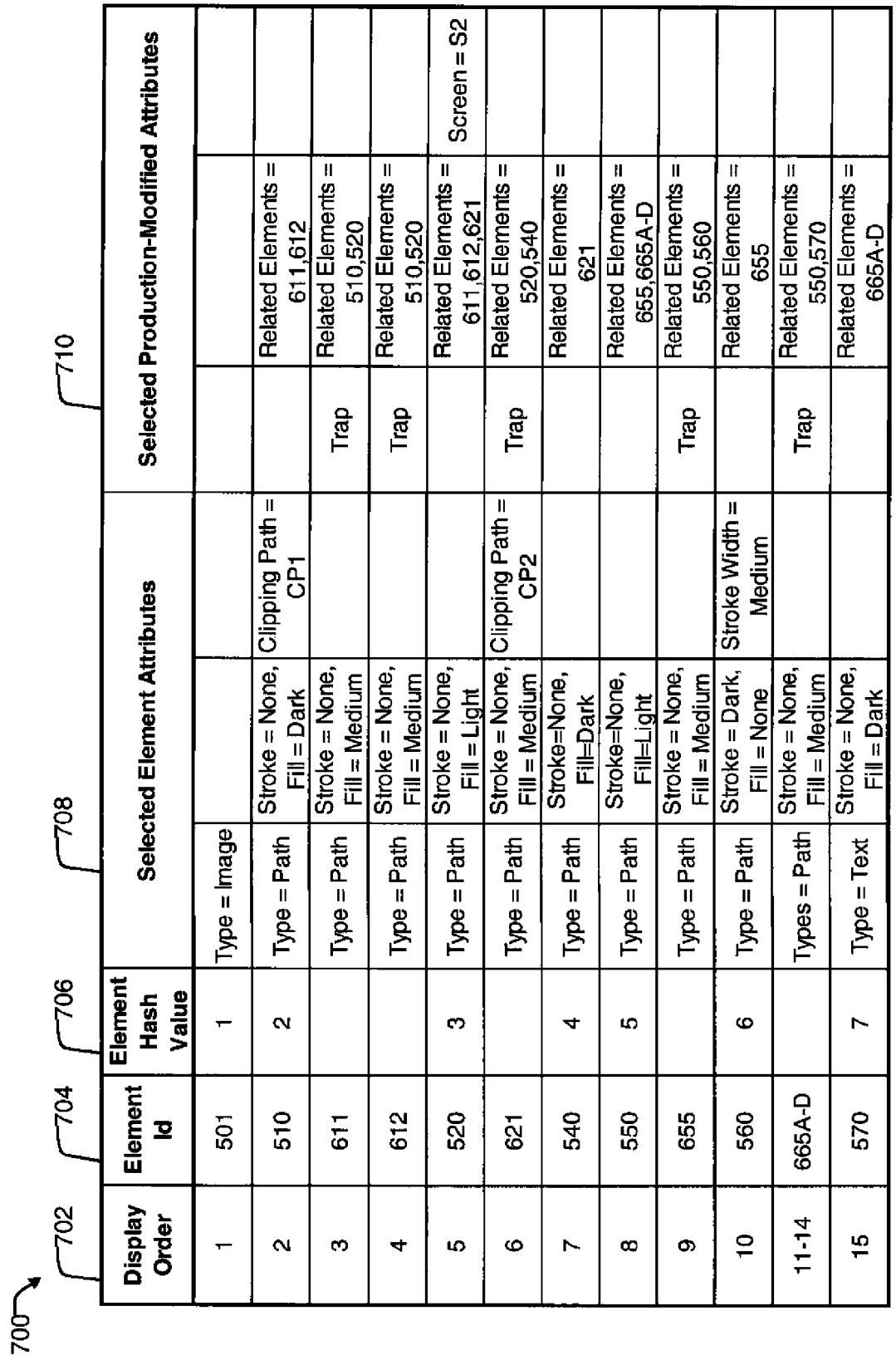
FIG. 7 is a data structure diagram illustrating the document corresponding to FIG. 6.

FIG. 6 is a diagram illustrating a rendering of exemplary first document 201 shown in FIG. 5, immediately following the initial production phase that included trap-processing and halftone screening adjustments. FIG. 7 is a data structure diagram corresponding to FIG. 6 and illustrating aspects of exemplary first document 201 and associated data.

Graphic element identifiers, shown in column 704, that would be created according to the methods of FIG. 4, correspond to graphic element references in FIG. 6. For illustrative purposes, the identifiers are chosen so that the last two digits indicate relative display order. The higher-order digits reflect the number of the figure in which the graphic element is first illustrated. This convention is continued throughout subsequent figures.

Trap graphic elements 611, 612, 621, 655 and 665A-D have been added during the production phase to improve the printed quality at boundaries between light-colored and dark-colored content graphic elements. For the purposes of illustration only, a trap graphic element is displayed after the darker content graphic element and before the lighter content graphic element. Further, a trap graphic element's clipping path is adjacent to the lighter-colored graphic element and extends into the darker-colored graphic element. A trap graphic element is created as a path graphic element with a medium-colored fill and no stroke.

FIG. 7 describes selected attributes of content and production graphic elements. Items of note include:

Hash values that would result from a comparison of graphic elements according to the method described in FIG. 4 are shown in column 706.

Attribute values, such as Clipping Path and Stroke Width, that are pertinent to the example, are shown in column 708.

FIG. 7 describes selected production-modified graphic attributes in column 710, reflecting:

the identification of production graphic elements, the relationship between trap and content graphic elements, and the halftone screen adjustments made (namely element 420 has been associated with screen S2).

Figure 8:
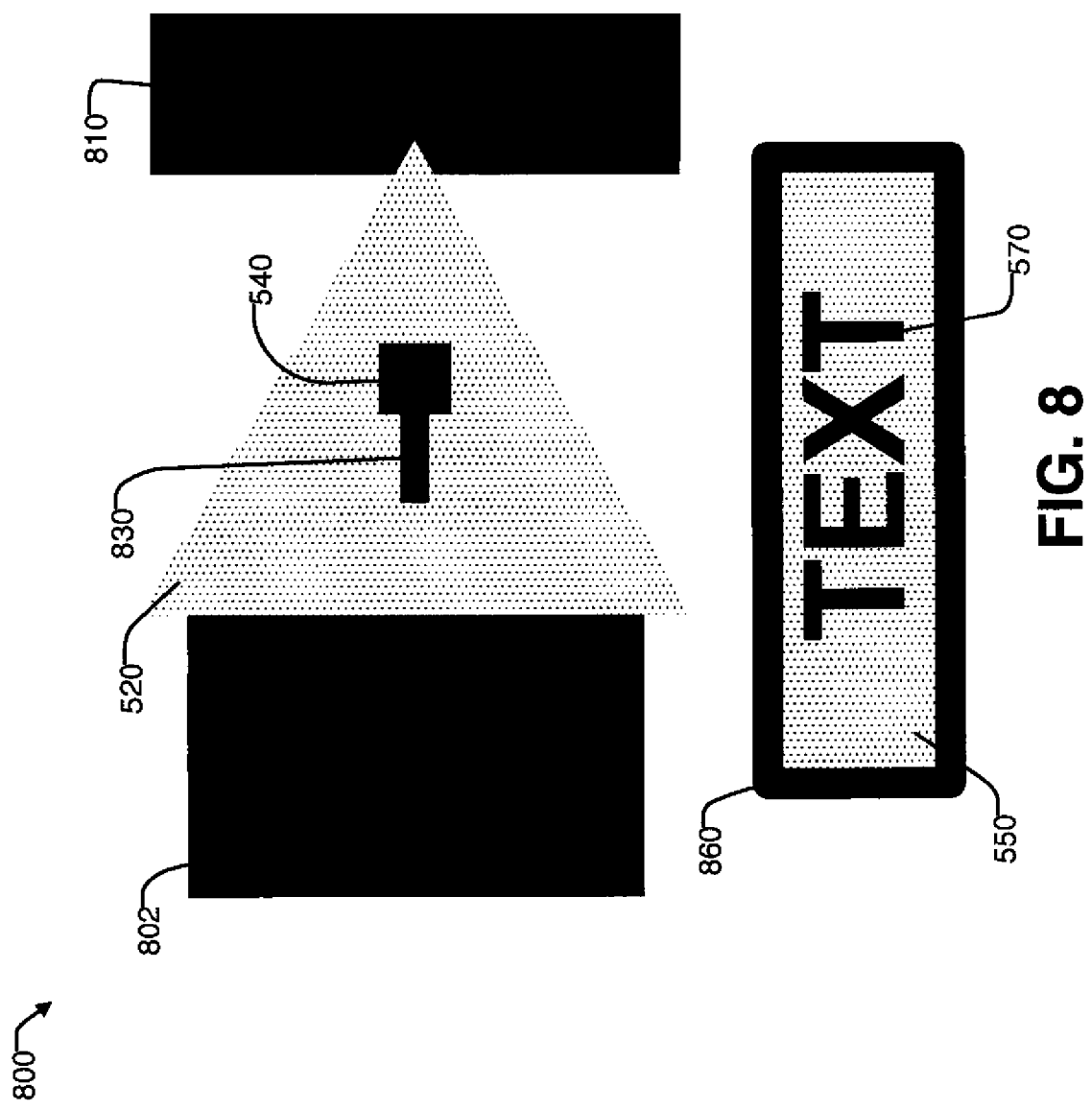
FIG. 8 is a diagram illustrating the rendered appearance of a second document, created by revising content of a first document.
Figure 9:
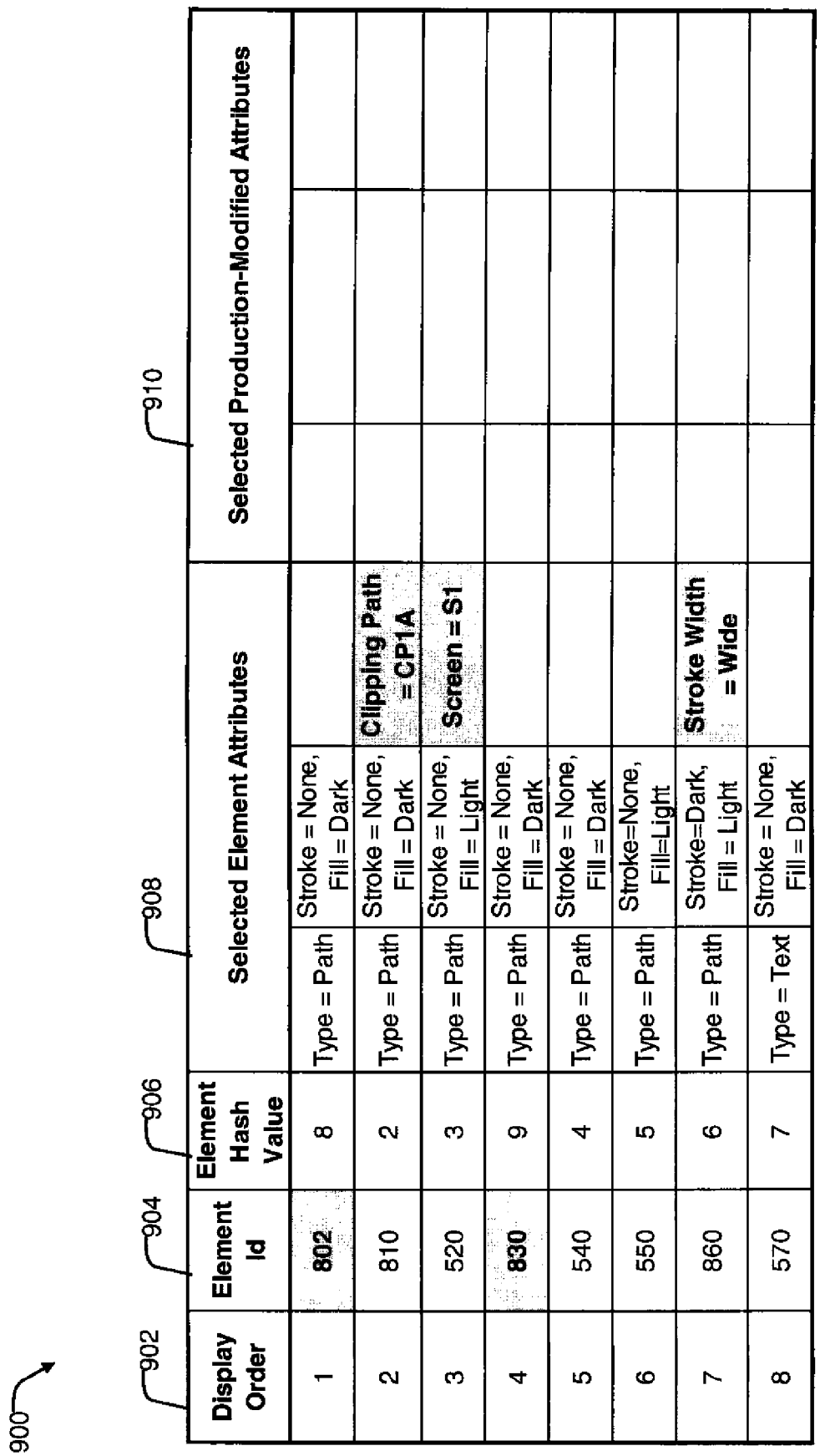
FIG. 9 is a data structure diagram illustrating the document corresponding to FIG. 8.

FIG. 8 is a diagram illustrating a rendering of an exemplary second document 202, immediately following a subsequent content creation phase that has occurred in parallel with the initial production phase. FIG. 9 is a data structure diagram corresponding to FIG. 8 at this stage. Content revisions are highlighted in FIG. 9. In particular:

Image 501 has been deleted and thus is not shown in FIG. 9.

Rectangular path 802 and rectangular path 830 have been added.

Rectangular path 510 has been modified to have a new clipping path, CP1A. Note that this modified graphic element, according to the method of FIG. 4, would have the same hash value as rectangular path 510 but upon detailed examination would not be sufficiently similar and is thus assigned identifier 810.

Triangular path 520 has halftone screen S1 associated with it, consistent with the original content phase definition.

Rectangular path 560 has been modified to have a wide stroke width and is identified as 860.

FIG. 10 is a data structure diagram illustrating application of an exemplary edit script 250, generated using the method described in FIG. 4 with inputs: first document 201, illustrated in FIGS. 6 and 7; and second document 202, illustrated in FIGS. 8 and 9. The ordered steps, shown in column 1002, include major steps, indicated by numerals, corresponding to edits that terminate with the preservation of a common item. Step actions, shown in column 1004, include:

"Delete", corresponding to a content graphic element unique to first document 201.

"Add", corresponding to a content graphic element unique to second document 202.

"No action", corresponding to a graphic element identified as sufficiently similar amongst both documents. In one embodiment of the invention, this action can be included in the edit script to enable generation of other types of documents using edit script 250 as described below. Other methods for keeping track of compared graphic elements that are sufficiently similar can also be utilized.

"N/A", corresponding to a graphic element that was not examined during the comparison and thus is preserved in the merged document. This action is not explicitly included in edit script 250.

"Derived delete", corresponding to a production graphic element depending upon one or more deleted graphic elements. This action is not explicitly included in edit script 250 but is derived by being related to graphic elements that were explicitly deleted.

Step parameters, shown in column 1006, identify the reference document (column 910) for the action and the relative add location (column 1012) where applicable. Additional processing attributes (column 1014) exemplify attributes set by document merger 220, including identification of new objects that may require trap-processing and preserved trap graphic elements that may require adjustment. Additional processing outcomes (column 1020) indicate what would occur if additional processing is performed. Outcomes are described in more detail in FIG. 13.

Figure 11:
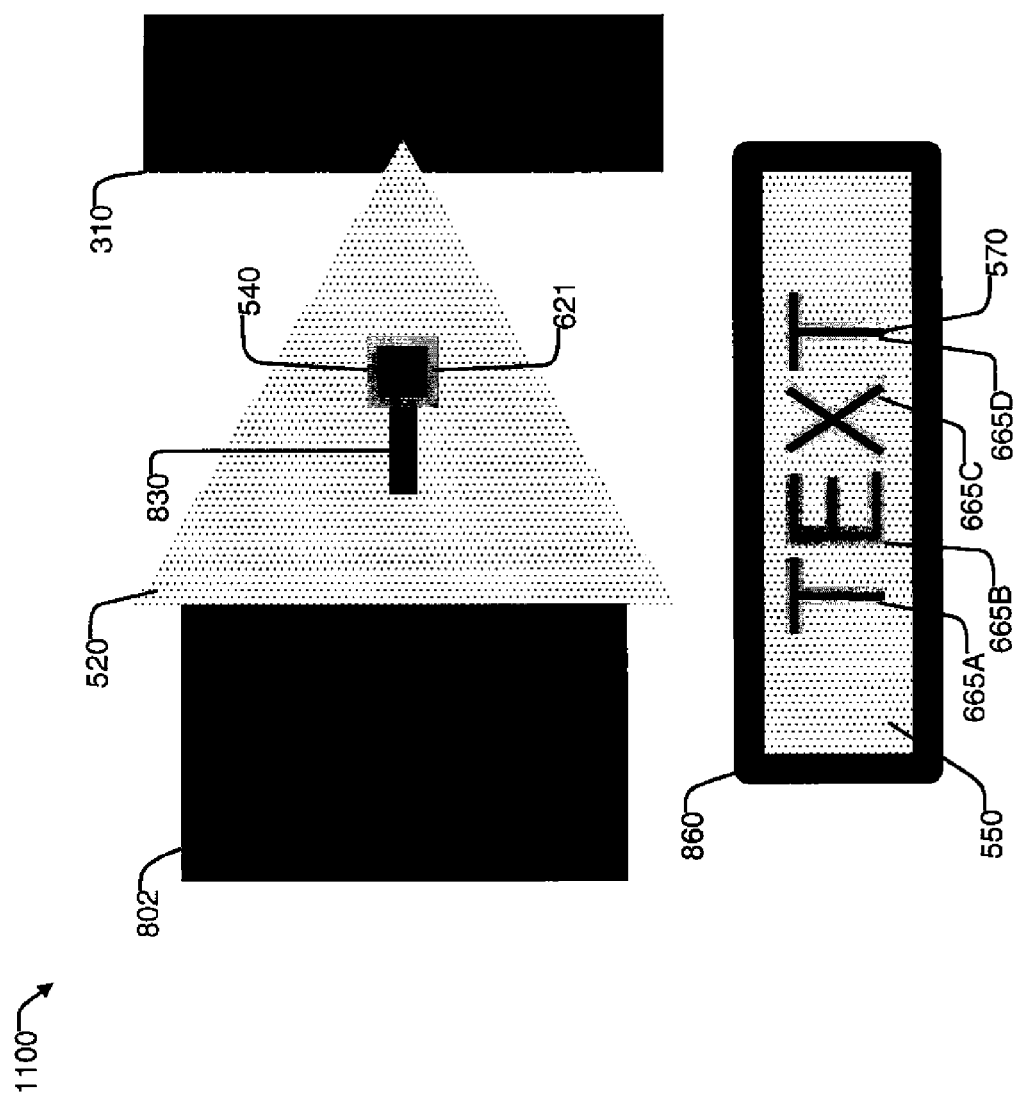
FIG. 11 is a diagram illustrating the rendered appearance of a merged document created by applying an edit script to a first document.

FIG. 11 is a diagram illustrating a rendering of exemplary merged document 203. FIG. 12 is a data structure diagram corresponding to FIG. 11, and illustrating aspects of exemplary merged document 203 and associated data. Items of note include:

Graphic elements 501, 510, 611, 612, 655, and 560 were deleted from first document 201 illustrated in FIG. 7 and thus are not part of these figures.

Graphic elements 802, 810, 830 and 860 were added from second document 202, illustrated in FIG. 8. Added elements preserved their relative order in second document 202.

All other graphic elements from first document 201 were preserved along with any production-modified graphic attributes. As an example, triangular path 520 screen is S2 and rectangular path 621 clipping path is CP2. Related element associations were updated to correspond with deleted elements.

Figure 13:
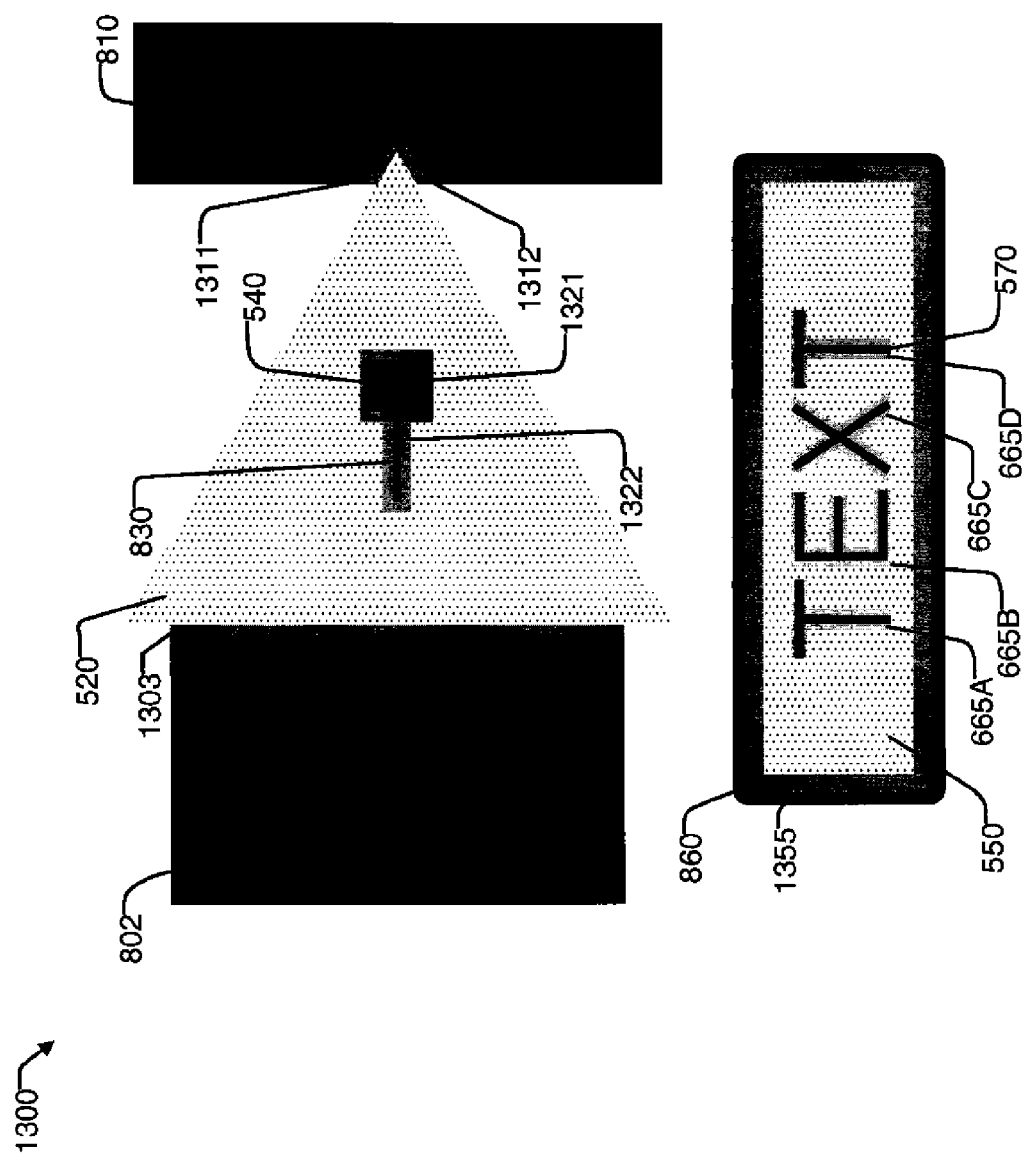
FIG. 13 is a diagram illustrating the rendered appearance of a document created by performing additional processing on a merged document.

FIG. 13 is a diagram illustrating a rendering of exemplary processed merged document 205. FIG. 14 is a data structure diagram corresponding to FIG. 13 and illustrating aspects of exemplary processed merged document 205 and associated data. Items of note include:

Trap graphic elements 1303, 1311, 1312, 1322 and 1355 were added to correspond with new content graphic element boundaries created by adding graphic elements 802, 810, 830 and 860. Related element associations for affected graphic elements were updated.

Trap graphic element 1321 clipping path was adjusted to CP2A because of the boundary created between added rectangular graphic element 830 and square graphic element 540.

Trap graphic elements 665A-D were unaffected because the boundaries between path graphic element 550 and text graphic element 570 did not change.

Visual Comparison

The method of FIG. 3 also includes steps that allow visual comparison of first document 201 and second document 202. These steps begin after document comparator 210 has generated edit script 250. In one embodiment of the invention, comparison visualizer 230 begins at block 310 by generating three temporary documents based on first document 201, second document 202 and edit script 250. These documents, which can be saved to data store 110 for later use, include:

Unique to first document 231, includes the graphic elements existing in first document 201 alone. An exemplary method for generating document 231 is to select the graphic elements having "delete" actions in edit script 250.

Unique to second document 232, includes the graphic elements existing in second document 202 alone. An exemplary method for generating document 232 is to select the graphic elements having "add" actions in edit script 250.

Common to both 233, includes the graphic elements identified as sufficiently similar in first document 201 and second document 202. An exemplary method for generating document 233 is to select the graphic elements examined during the comparison and identified "no action" actions in edit script 250.

According to one embodiment of the invention, production graphic elements are excluded from the creation of the temporary documents so that visual comparison of content-only graphic elements is achieved.

Next, in block 312, component visualizer 230 presents a GUI including a multi-layered rendering of the temporary documents. The renderings show defined overprint and knock out characteristics within a layer. When more than one layer is visible, the pixels from each visible layer are composited. When composited, graphic element pixels in higher layers knock out graphic element pixels in lower layers so that boundaries between objects existing in different layers are more visible. GUI viewing controls are provided to:

control the visibility of each layer;

control the layering order of each rendering;

adjust the tonality or color of each layer to distinguish graphic elements, having similar tone or color, between layers;

select one or more graphic elements by asserting graphic element attribute values (e.g. select path graphic elements), causing the graphic element to be highlighted in the GUI; and select one or more graphic elements by pointing at an exposed area of the graphic element's pixels in the GUI, causing the graphic element to be highlighted in the GUI.

"Method For Displaying Selected Or Highlighted Objects Using Raster Compositing", the title of application Ser. No. 10/677,332, describes graphic element GUI compositing and selection methods and is incorporated by reference herein.

Figure 15:
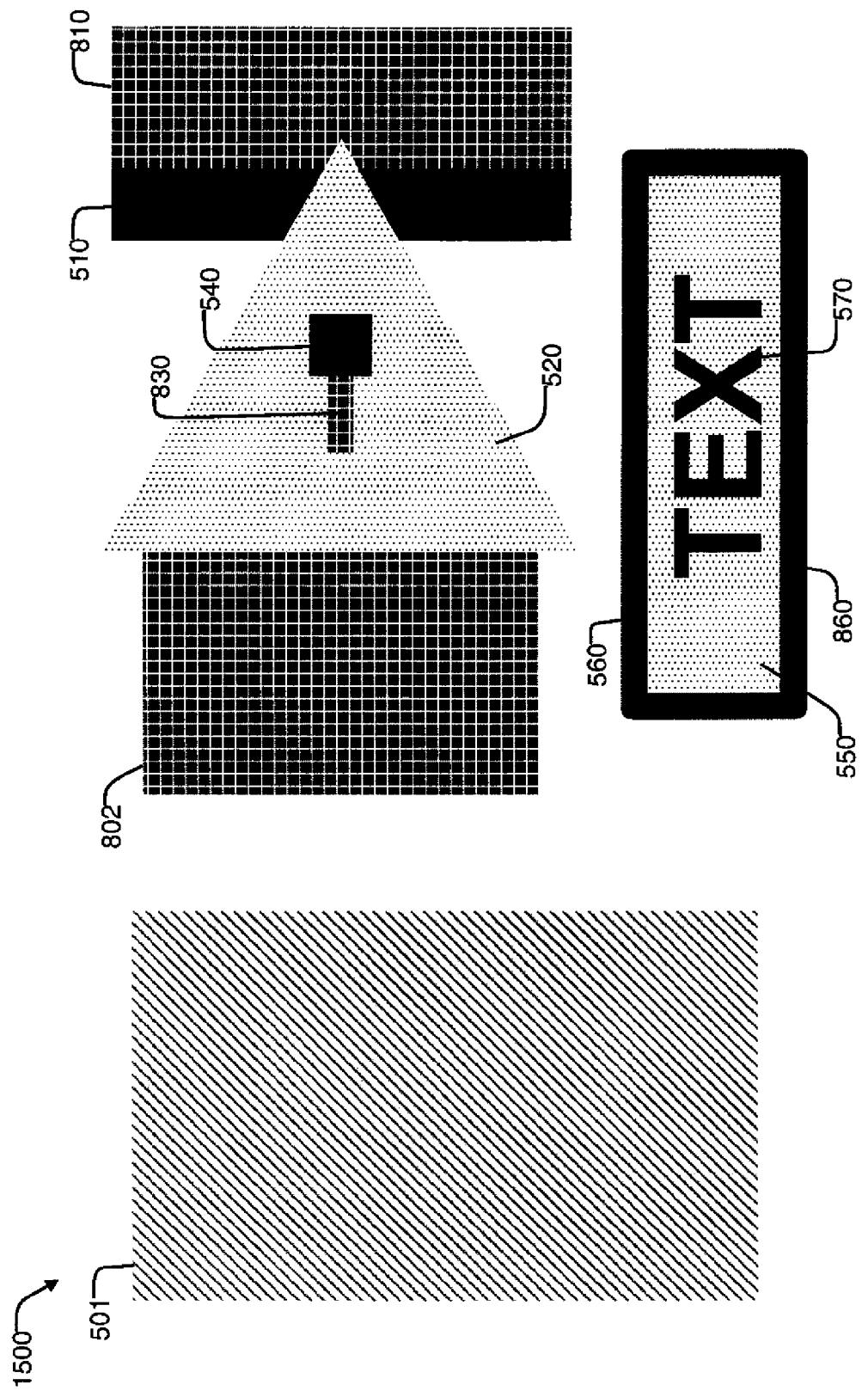
FIG. 15 is a diagram illustrating a portion of a GUI that presents a layered view of graphic elements, with those being common to both documents prominently displayed.

FIG. 15 is a diagram illustrating the rendered display portion of component visualizer 230 GUI from the previously detailed example with all layers visible. Layer common to both 233 is on top, followed by unique to second document 232 and unique to first document 231. The tonality of unique to second document 232 has been decreased so that its dark-colored pixels now appear as medium-colored hatched fills and medium-colored strokes. This view shows the difference in size between graphic elements 510 and 810. It also clarifies the boundary between graphic element 540 and 830. However, in this view, graphic element 860 knocks out graphic element 560.

Figure 16:
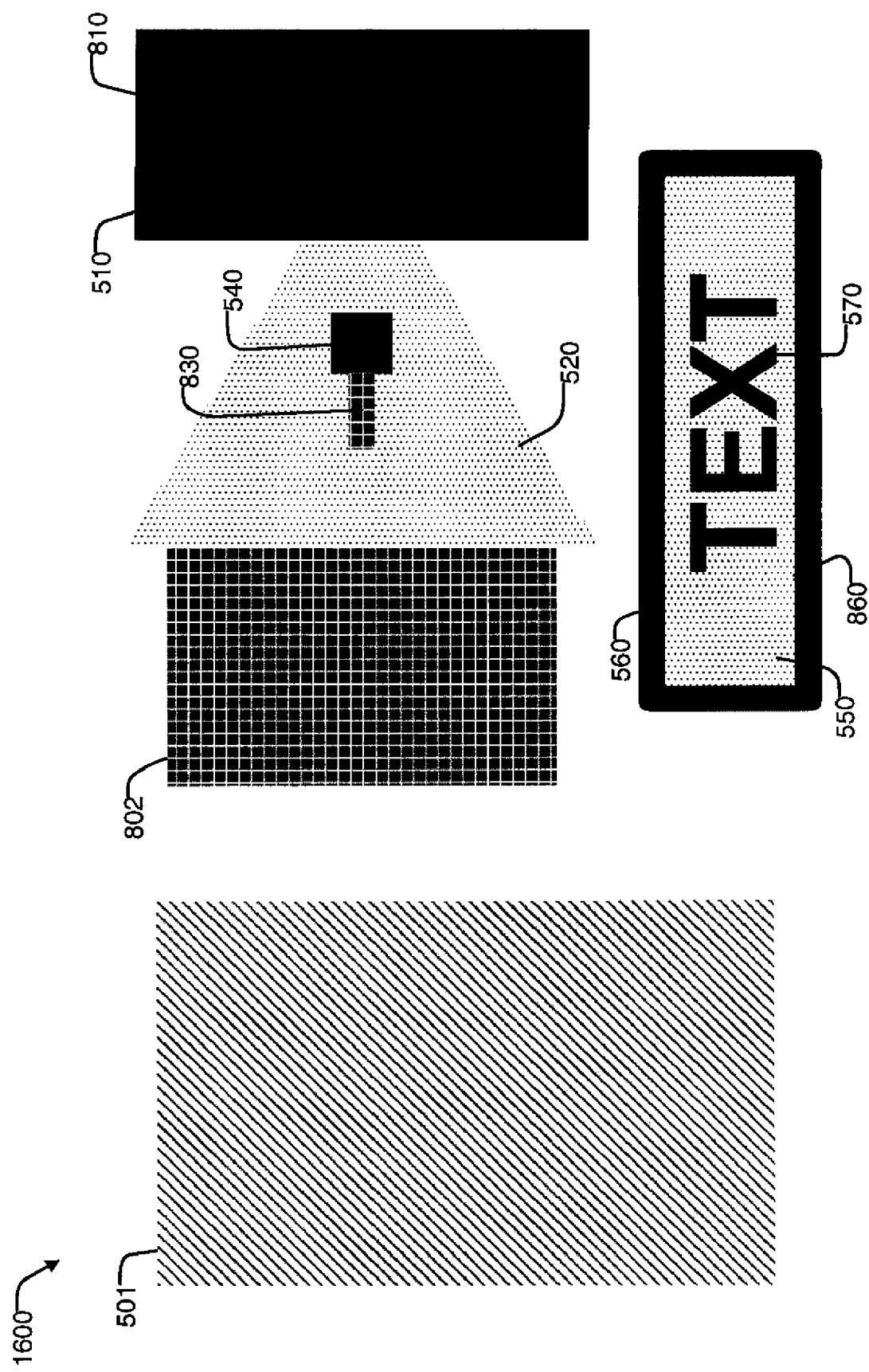
FIG. 16 is a diagram illustrating a portion of a GUI that presents a layered view of graphic elements, with those being unique to the first document prominently displayed.

FIG. 16 is a diagram illustrating the rendered display portion of component visualizer 230 GUI from the previously detailed example with all layers visible. Layer unique to first document 231 is on top, followed by common to both 233 and unique to second document 232. This view shows all of graphic element 510 but obscures graphic element 810. This view also shows the difference in stroke width between graphic elements 560 and 860.

Figure 17:
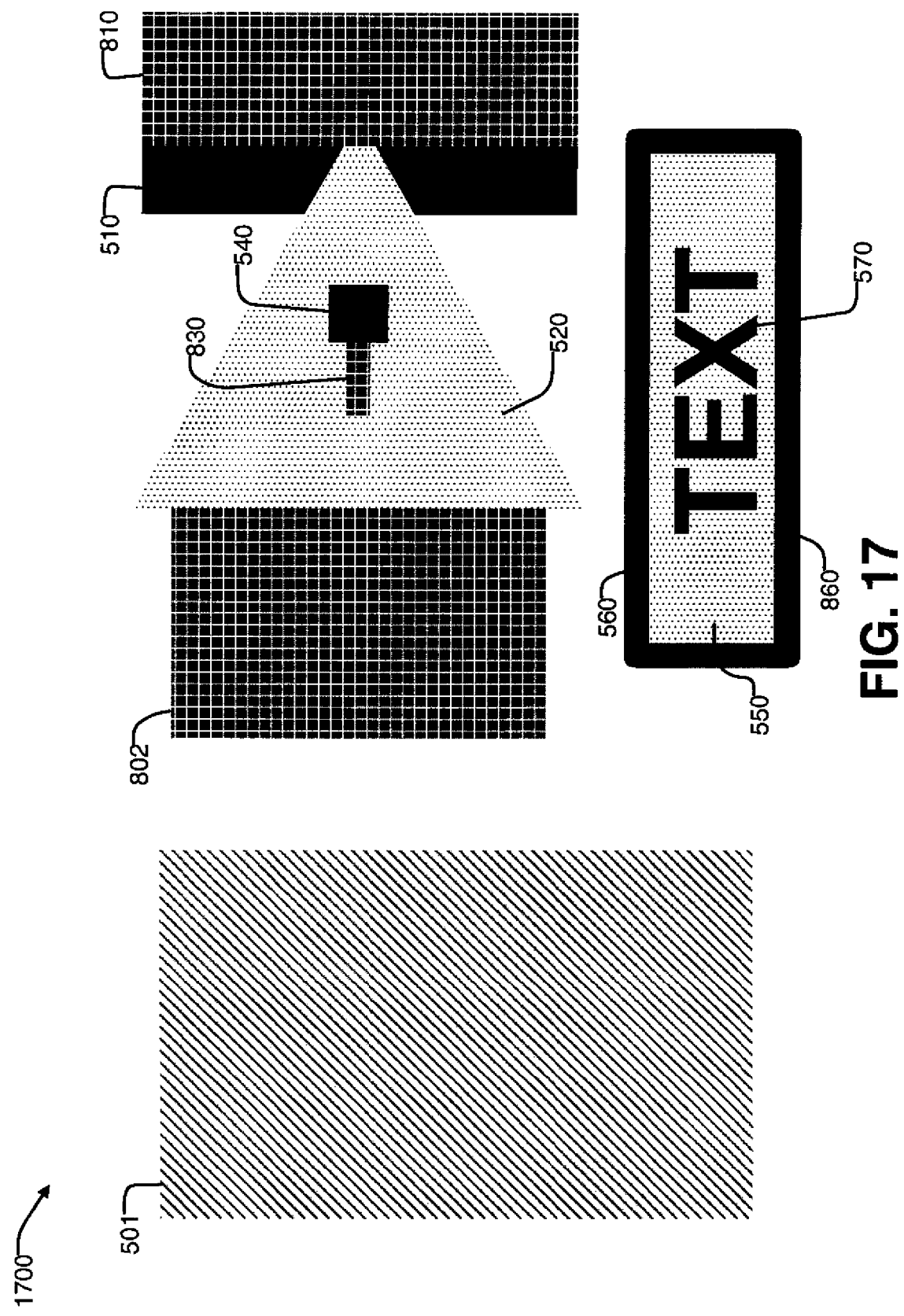
FIG. 17 is a diagram illustrating a portion of a GUI that presents a layered view of graphic elements, with those being unique to the second document prominently displayed.

FIG. 17 is a diagram illustrating the rendered display portion of component visualizer 230 GUI from the previously detailed example with all layers visible. Layer unique to second document 232 is on top, followed by common to both 232 and unique to first document 231. This layer presents little new information, relative to the other views, only because of the nature of the particular example. FIG. 17 further illustrates the effects of layer knockouts distorting the artist's visual intent. In another embodiment of the invention, comparison visualizer 230 can include another layer containing the rendering of merged document 203. This enables the artist's visual intent to be viewed in conjunction with the temporary documents.

Block 314 continues after the initial presentation of the layered-view GUI. In addition to the GUI view controls described above, document visualizer 230 provides controls enabling the user to override actions in the automatically generated edit script 250. Controls are provided to:

view the properties of a selected graphic element, including an indication of whether the selected graphic element is present in merged document 203;

delete the selected graphic element from the merged document to effect an override in edit script 250, wherein:

deleting from common to both 232 results in the "no action" (from first document 201) action being replaced by an add (from second document 202) action for the graphic element in second document 202 having the same identifier, deleting from unique to first document 231 results in the delete (from first document 201) action being replaced by a "no action" action, and deleting from unique to second document 232 results in the "add" action being removed; and enable or disable the visibility of deleted graphic element in its corresponding layer.

Block 314 continues with comparison visualizer 230 updating edit script 250 with all action overrides resulting from the GUI session. Block 314 completes with comparison visualizer 230 adjusting production graphic elements actions, affected by the action overrides, in edit script 250. For example, a "derived delete" action can be removed if the "delete" action for a related content graphic element is overridden. The method then proceeds to block 316, where a decision is made to reapply edit script 250. If edit script 250 has been overridden, the decision can be yes, based on a user preference or in response to a prompt provided from comparison visualizer 230 GUI. If the decision is yes, the method proceeds to block 317, having the same behavior as block 308, and then to block 318. If the decision is no, the method proceeds directly to block 318.

In another embodiment of the invention, comparison visualizer 230 executes a method for viewing, based on a single layered document rather than multiple documents. A prerequisite for this method is that each graphic element in the document is associated with one view layer. During display of the document, control of a layer's visibility determines whether pixels, corresponding to the graphic elements associated with that layer, are displayed. The document defines one display order for all graphic elements amongst all layers. The layered document can be produced by document merger 220, comparison visualizer 230 or by other means.

The layered document can be produced by selecting graphic elements categorized as common to both documents (chosen from either document), unique to the first document and unique to the second document. Graphic elements can be associated to a layer corresponding to their category. Graphic elements chosen from the first document retain their relative display ordering. Similarly graphic elements chosen from the second document retain their relative display ordering. Graphic elements chosen from one document are also ordered relative to graphic elements, chosen from the other document, that are sufficiently similar to graphic elements from the one document. For example, if a first document includes an ordered list of graphic elements: A, B1, and C and a second document includes an ordered list of graphic elements: D, B2, and E, the layered document can comprise an ordered list of graphic elements: A, D, B1, C, and E. In this example B1 and B2 are sufficiently similar. Other alternate orderings that preserve the relative ordering from both documents are possible (e.g. D, A, B1, E, C).

In some embodiments, document comparator 210, document merger 220 and comparison visualizer 230 can be adapted to extend the inventive methods beyond two documents. As an example, when a document is reproduced in a display or in print with content that varies according to a regional preference (e.g. language and pricing), several documents can sometimes be produced. Each document can contain common graphic elements as well as ones that are unique to a particular regional version. Each document can also include a composite color document, where graphic elements can paint in multiple colors, or a color separated document. It is common practice to define regionally varying content using fewer colors (e.g. black). Thus, it may be expected that there is no version-specific content in certain colors (e.g. cyan, magenta and yellow).

Unfortunately, the manual process of producing these documents can sometimes result in intended common content being somewhat different (e.g. a graphic element accidentally deleted, display order shifted or otherwise modified in one version). So, determining these discrepancies before printing is important. It is desirable to merge these separate version documents into one layered document so that discrepancies can be more easily determined through visual means and to simplify the regionalized reproduction process. When merging graphic elements together, it is important to classify each one as either common amongst all version documents or unique to one or more version documents. It is also important to preserve a graphic element's display order, relative to other graphic elements from its corresponding version document.

Layer-based adjustment of tonality and color may not be provided in some embodiments. In these cases, the ability to distinguish graphic element borders can be accomplished by controlling layer visibility and selecting graphic elements, causing their colors or fills to be altered.

Version Documents

Methods, similar to those described above, can be used to merge a set of version documents into a single layered document. Exemplary methods are described below. In summary, layers are identified, based on the version documents. For example, a common layer and one layer corresponding to each version document can be identified. One document is identified as a base document to construct an initial layered document including graphic elements assigned to the common layer. Each version document is compared with the current layered document in sequence to merge the version document's graphic elements into the layered document and associate each graphic element with an appropriate layer.

Figure 18:
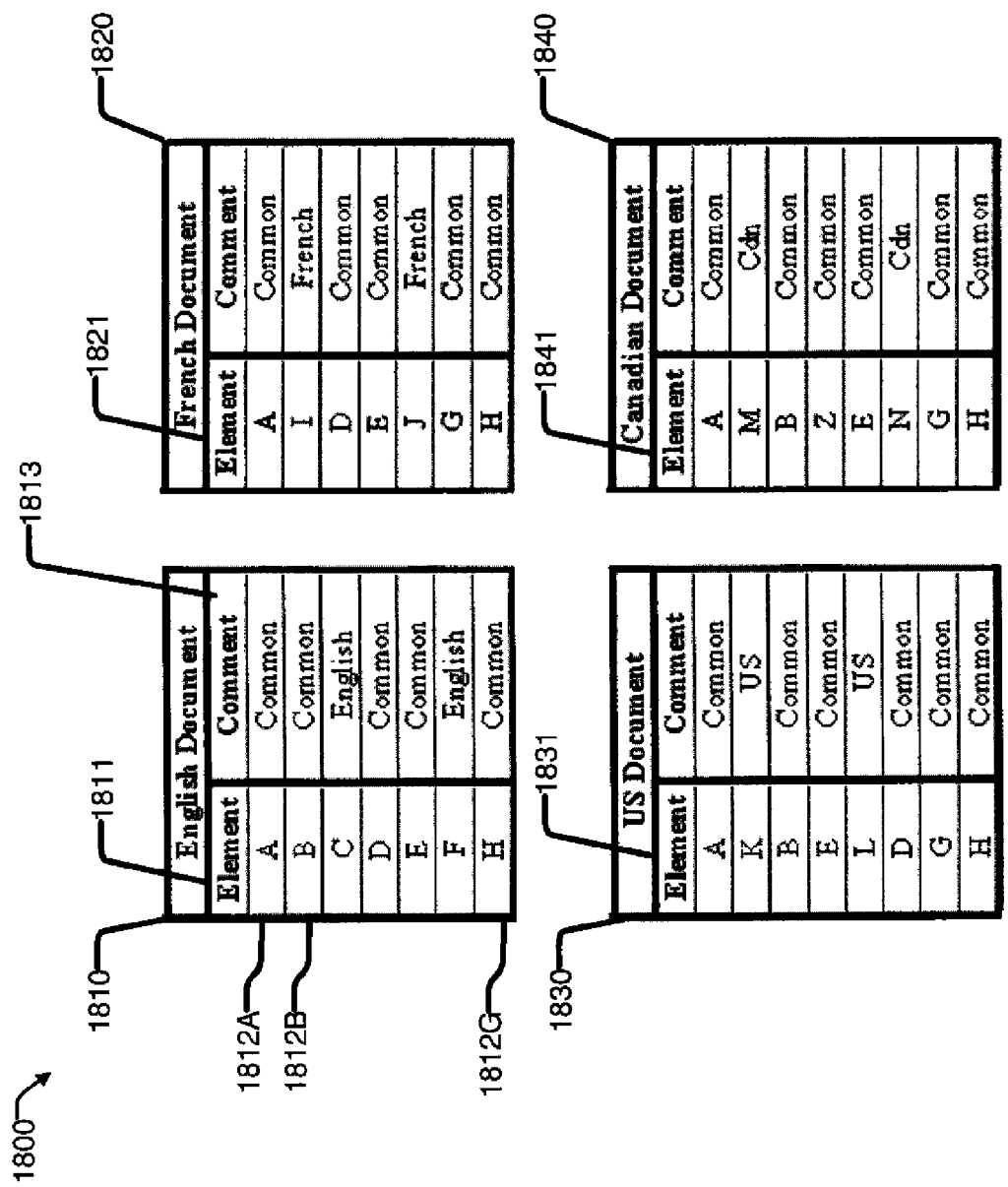
FIG. 18 is a diagram illustrating graphic elements of an exemplary set of version documents according to one embodiment of the invention.

FIG. 18 is a diagram illustrating graphic elements of an exemplary set of composite color version documents according to one embodiment of the invention. English document 1810 contains common (e.g. graphics and photos) and English language-specific (e.g. captions and text) content. French document 1820 contains common and French language-specific content. U.S. document 1830 contains common and US-specific (e.g. prices) content. Canadian document 1840 contains common and Canadian-specific (e.g. prices) content. Each document is depicted as a display-ordered list of graphic element identifiers corresponding to graphic elements, determined, for example, by interpreting a document page description language (PDL). For clarity, additional document and graphic element information is not illustrated.

List 1811, for example, includes the graphic element identifiers 1812 for English document 1810. Graphic element identifier 1812A has the character value "A". Other value ranges, such as integers, can be used. Thus, the graphic element corresponding with identifier 1812A displays first, followed by the one associated with identifier 1812B and so on.

A comment 1813 is provided for illustrative purposes beside each graphic element identifier 1812. It indicates the original intent of the associated graphic element. For example, the graphic element associated with identifier 1812A is intended to be commonly defined amongst all version documents. "Commonly defined" means that the visual appearance of the graphic element is substantially the same as presented in each version document. That means that it's attributes (e.g. color, geometry and other attributes) are sufficiently similar (as described above) and its relative display order is consistent amongst the version documents. Other comment values indicate that the corresponding graphic element's intent is to provide version-specific content.

For illustrative purposes, inconsistencies have been created in the illustrated version documents. As an example, English document 1810 is missing common element "G". As another example, French document 1820 is missing common element "B". As another example, graphic elements "E" and "L" have been repositioned in the display order of U.S. document 1830. They should have been positioned after element "D". As another example, graphic element "Z" was intended to be element "D" but was somehow modified so that it is not sufficiently similar to the definition in the other documents and is thus identified as a unique element.

Figure 19:
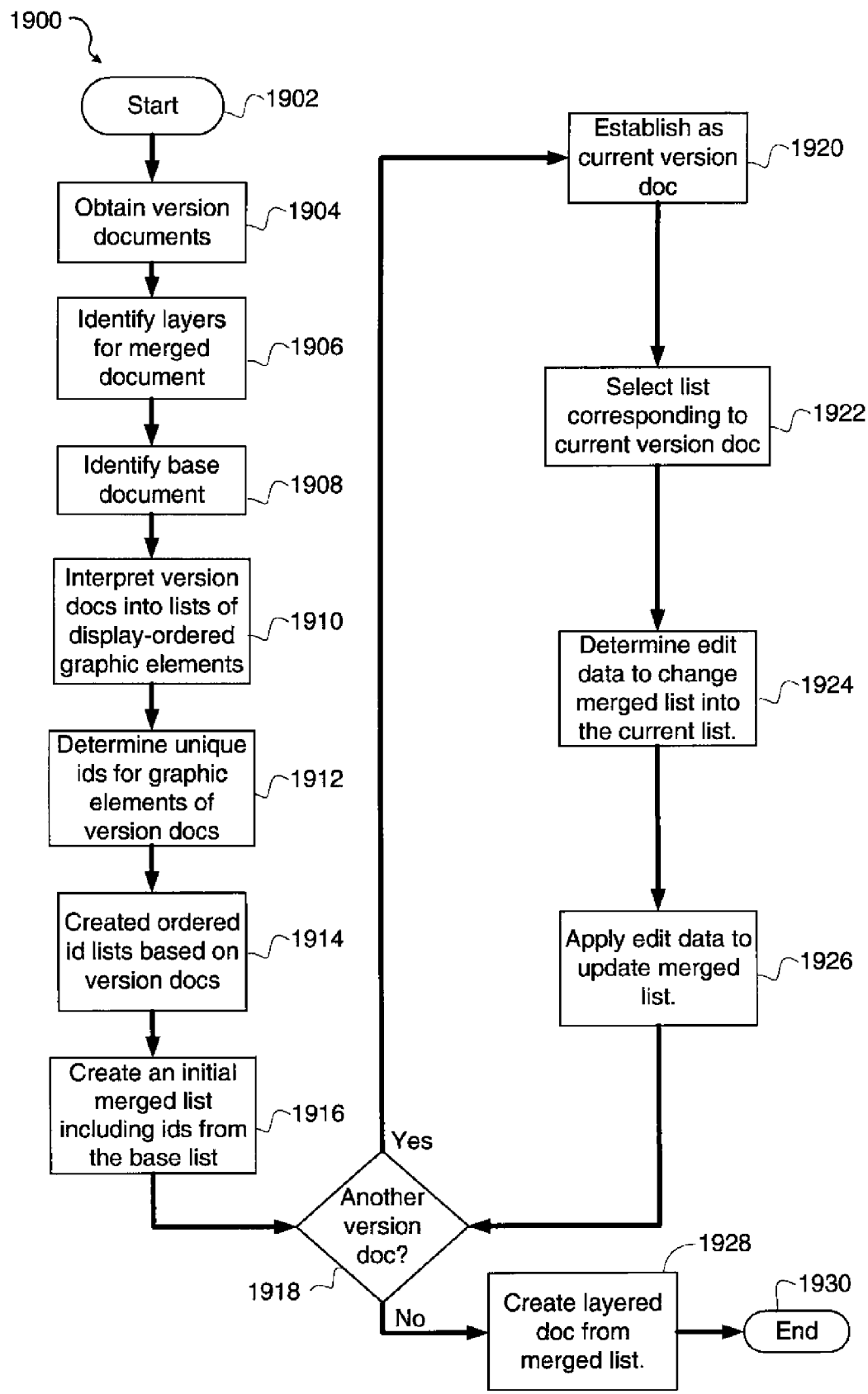
FIG. 19 is a diagram illustrating an exemplary method for merging version documents into a layered document according to one embodiment of the invention.

FIG. 19 is a diagram illustrating an exemplary method for merging version documents into a layered document according to one embodiment of the invention. The method begins at block 1902 and proceeds to block 1904 where the set of version documents (e.g. 1810, 1820, 1830 and 1840) are obtained by document merger 220. Document merger 220 identifies layers at block 1906 and associates each layer with a version document. This can be done automatically, by association with version document names or other attributes. Alternatively, a user can identify layers and associate each with a version document. A subset of the version documents can be merged if desired.

Next, the method proceeds to block 1908 where one version document is identified as the base document (e.g. English document 1810) containing the candidate common graphic elements. Next, at block 1910, each version document is interpreted to form display-ordered graphic element representations if the documents were in PDL format.

Next, at block 1912, unique identifiers are established for each graphic element amongst all the version documents. Methods, similar to those describe above, are used to assign the same identifier to graphic elements in different documents if those graphic elements are sufficiently similar. In some embodiments, this can be optionally preceded by an adjustment of graphic element attributes based on characteristics of the version documents. For example, a trim box or other page-level characteristics can be different in each document, causing similar graphic elements to have different positions. Compensation for this inconsistency can be accomplished, for example, by aligning the centre of trim boxes.

Next, at block 1914, graphic element identifier lists (e.g. 1811, 1821, 1831, and 1841) are created with one corresponding to each version document. A base list (e.g. English list 1811) is identified, corresponding to the base document.

Next, at block 1916, an initial version of a merged list is created from the base list. A merged list 2001, exemplified by initial merged list 2001A in FIG. 20, includes a display-ordered list of graphic element identifiers 2002 with associated layer identifiers 2003. In this example, initial merged list 2001A includes each graphic element identifier from list 1811 with each identifier assigned to layer 0. In this example, 0 is the value representing the "common" layer, 1 is the value representing "unique to English document" layer, 2 is the value representing the "unique to French document" layer, 3 is the value representing the "unique to US document" layer, and 4 is the identifier representing the "unique to Canadian document" layer.

Next, at block 1918, document merger 220 determines if another version document exists. If not, it proceeds to block 1928. If yes, it proceeds to block 1920 to begin the process of merging this version document.

Proceeding at block 1920 the version document is established as the current version document and at block 1922 the corresponding list is established as the current list to be merged. Thus, for example, French document 1820 and French list 1821 are first identified as current.

Next, document merger 220 proceeds to block 1924 where it provides a first list, including only element identifiers derived from merged list 2001 to document comparator 210. Document comparator 210 also receives a second list, derived from the current list in order to generate data suitable for updating merged list 2001. As an example, for the first iteration, merge list 2001A and French list 1821 are used to derive the first and second lists, respectively. Document comparator 210 generates edit script 250 as a result for document merger 220.

Next, at block 1926, document merger 220 applies edit script 250 to merged list 2001 in conjunction with the version document lists to form an updated merged list 2001. An example of this is described in detail below. Next, document merger 220 proceeds to block 1918 as described above.

Proceeding at block 1928, document merger 220 has determined that no additional version document lists need to be merged into merged list 2001. Document merger 220 produces layered merged document 203 from merged list 2001. Each graphic element in merged document 203 is associated with the layer identified in merged list 2001. Merged document 203 can be represented in display-ordered list form or optionally in PDL format. Upon creating layered, merged document 203, the method completes at block 1930.

Figure 20:
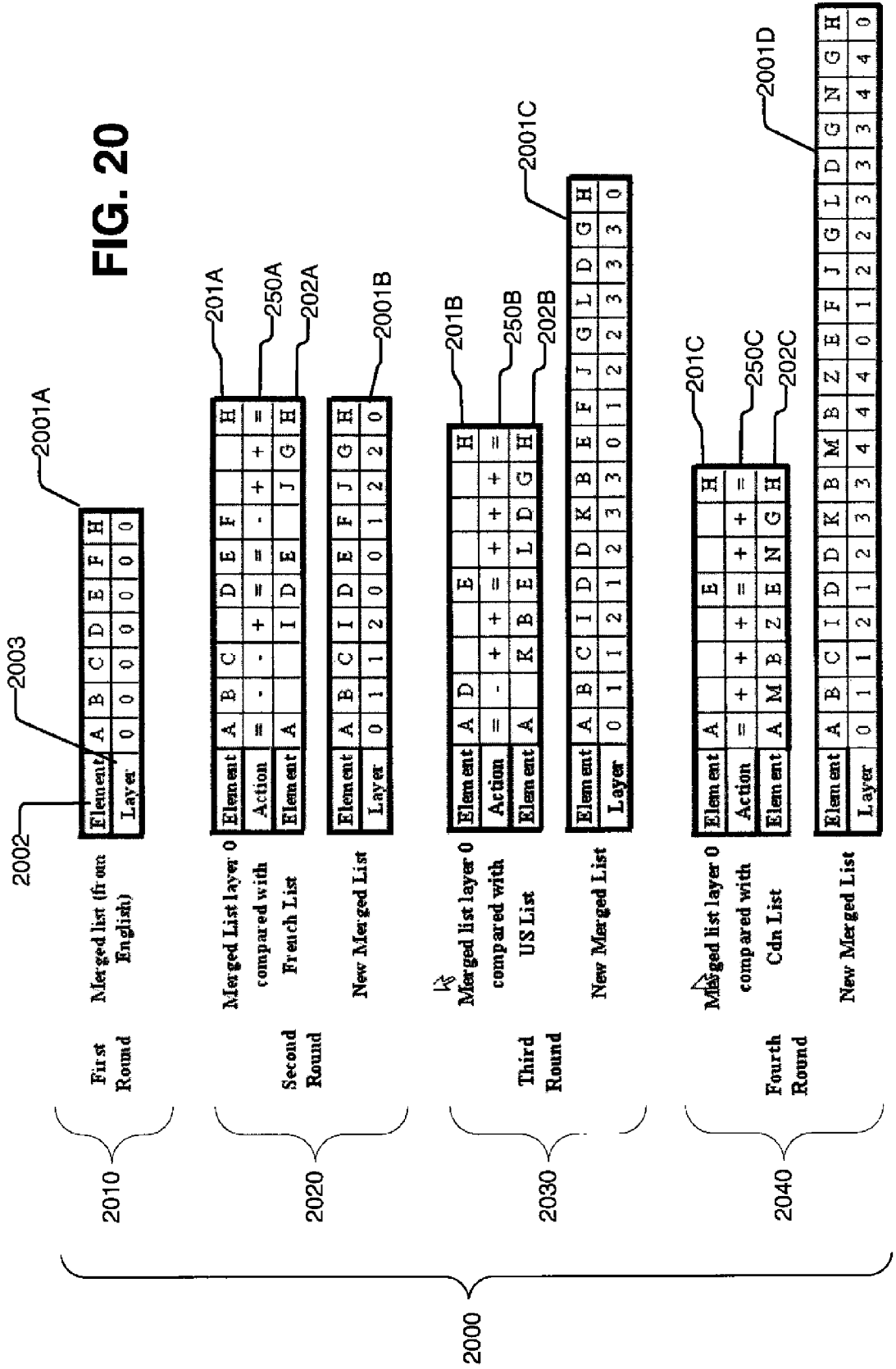
FIG. 20 is a diagram illustrating intermediate results of an exemplary version document merging method according to one embodiment of the invention.

FIG. 20 is a diagram illustrating intermediate results of an exemplary version document merging method according to one embodiment of the invention. The intermediate results of the method of FIG. 19 are depicted as a series of rounds 2010, 2020, 2030 and 2040. As described above, first round 2010 depicts initial merged list 2001A.

Second round 2020, corresponding to results from merging French list 1822 with merged list 2001A, depicts summary data for first list 201A, second list 202A, and edit script 250A.

Lists 201 and 202 are depicted, with staggered entries for illustrative purposes only, so that each graphic element identifier is associated with only one action from edit script 250. Actions depicted as "=" correspond to a "no action" action, indicating that the associated element identifier is common to both lists 201 and 202. Actions depicted as "−" correspond to a "delete" action, indicating that the associated element identifier is unique to first list 201. Actions depicted as "+" are an "add" action, indicating that the associated element identifier is unique to second list 202.

For second round 2020, first list 201A includes a display-ordered list of graphic element identifiers selected from merged list 2001A. The criteria for selection is graphic elements associated with the (common) layer 0. In this case, that is all of the graphic elements, indicating that all are still candidates to be common graphic elements.

For second round 2020, second list 202A includes a display-ordered list of graphic element identifiers selected from French list 1822. The criteria for selection can be established to include the entire list, as depicted in these examples. In some embodiments it may be preferred to first examine French list 1822 to determine if there are any graphic element identifiers that are not in the set of those already associated with layer 0 of merged list 2001A. This may be done, for example, to reduce the number of comparisons performed by document comparator 210. In this case, graphic element identifiers, corresponding to those that are not selected, can be modified to flag them for subsequent processing, described below. For example, if integer identifiers are used, an element identifier can be negated to indicate that it was not compared by document comparator 210 and thus is not referenced by edit script 250.

Second round 2020 also depicts an updated merged list 2001B generated by applying edit script 250A. The method for applying edit script 250 of the examples of FIG. 20 is described in the following. Actions from edit script 250 are processed in order.

A graphic element identifier associated with an "=" action is left untouched in merged list 2001 since they it is still a candidate common graphic element. A graphic element identifier associated with a "+" action is added to merged list 2001. It is assigned a layer identifier corresponding to the layer associated with the current version list and document. A graphic element identifier associated with a "−" action remains in merged list 2001. However, its layer assignment is modified from layer 0, since they it is no longer a common candidate. Additional copies of the reclassified graphic element identifier may also need to be added to merged list 2001 as described below.

Referring to second round 2020, one can see that graphic element identifiers "A", "D", "E", and "H" have been identified by edit script 250A as common. Thus, their entries in merged list 2001B remain unchanged.

Graphic element identifiers "B", "C", and "F", have been identified as unique to first list 201A. Thus, their entries in merged list 2001B are changed to reflect that they are unique to (English) layer 1.

Graphic element identifiers "I", "J", and "G" have been identified as unique to second list 202A. Thus, entries for these graphic elements are added in merged list 2001B. They are added, with their relative order preserved, before the next element identifier that is commonly defined by first list 201A and second list 202A (e.g. "D" and "H"). The added entries are assigned (French) layer 2. As indicated above, in some embodiments, these graphic element identifiers would not have been compared. In this case, as each "=" action is processed, document merger 220 can examine the list used to derive second list 202 for negated element identifiers preceding a common graphic element. These element identifiers can be added to merged list 2001 before the associated common graphic element identifier while preserving their relative order from their originating list.

Referring to third round 2030, the method produces similar results with first list 201B derived from merged list 2001B, second list 202B derived from US list 1832 and corresponding edit script 250B. Merged list 2001C is produced with the following new aspects illustrated. Graphic element identifier "D" has been identified as unique to first list 201B. Since 201B corresponds to previously merged English list 1812 and French list 1822, entries corresponding to each list must now appear in merged list 2001C. Accordingly, the existing entry's layer association is modified to correspond with (English) layer 1. Another entry, corresponding to French list 1822, is added with a (French) layer 2 association after the layer 1 entry and before the common entry (e.g. "E").

It is noteworthy that the method has determined that "E" is common amongst the first three version documents, even though its relative order is different in US list 1832. This is an anomaly of the method that will still result in the inconsistency being determined upon visual inspection of layered merged document 203. That is, element "D" will be identified as unique to each version document which upon closer inspection of graphic element attributes will lead to the identification of the discrepancy with "E".

Referring to fourth round 2040, the final version of merged list 2001D is illustrated, indicating common graphic element identifiers and version-specific graphic element identifiers associated with the appropriate layer.

Other aspects of merging version documents can optionally be present in other embodiments. One aspect includes altering graphic element colorant values during creation of merged document 203 to provide unique colorant names amongst the layers. As an example, graphic elements that paint black can be renamed "Common black" for the common layer, "English black" for the English layer, and so on. This can enable more granular color separation control.

Another aspect includes identifying a list of expected colorants painted by graphic elements associated with a layer. This can facilitate for example, automatic detection of discrepancies. As an example, a graphic element painting an unexpected color for its associated layer can be associated with an "error" layer to enable quicker visual analysis.

Another aspect includes identifying whether a graphic element associated with a version-specific layer of the layered merged document 203 has characteristics that will knock out a portion of a graphic element associated with the common layer. Problems can arise where some where version content is typically defined to paint in only a few colors (e.g. black). This means that all of the cyan, magenta and yellow plates will be common amongst each printed version and can be reused for each print job. Inconsistencies in the common plates can be overlooked by visually inspecting a layered document when rendering a layered document with selected layers enabled.

As an example of a problem that can occur, assume two version-specific graphic elements, each painting black colorant with a knock out setting enabled where each is defined by a different version document and each have different but overlapping geometries and where each paints after a common graphic element that paints cyan. When rendered with common and any one of the version-specific layers enabled, the version-specific graphic element knocks out (e.g. creates an absence of color) in the cyan plane of the rendered image so that pixels corresponding to the graphic element only paint black. Note that each knocks out a different set of pixels because of their different geometries. If only the common layer is enabled, the knock out does not occur since the version-specific graphic element was not rendered. Thus, if only the common layer is enabled, cyan pixels corresponding to the common graphic element are painted in the region where the version-specific elements would have painted if rendered.

Thus, when visually inspecting a layered document, in a display for example, using layer-enabling controls, one can falsely conclude that the common colorants painted by the common layer are correct since the pixels for the common colorants are being rendered each time the layer controls are changed. When printing however, if the common plates (e.g. cyan) are generated while rendering a specific version of the document, the cyan plate will contain the white knock out corresponding to the version-specific graphic element. Thus the cyan plate will not be common, and this may not be discovered at an opportune time.

To address this visual inspection anomaly, some embodiments can identify graphic elements, associated with a version-specific layer, having a knock out characteristic. Once such a version-specific graphic element has been identified, an identically shaped knock out graphic element can be added to the layered document to paint before the version-specific graphic element. The knock out graphic element is defined to paint white (e.g. no colorant) in each of the expected colorants of the common layer. The knock out graphic element is associated with both the common layer and the layer associated with the version-specific graphic element. Thus, when visually inspecting the layered document with either the common or version-specific layers, the white knock out graphic element will be observed. In the specific example from above with only the common layer enabled, one would see the effects of both knock out graphic elements and could recognize that a cyan plate would not be common.

As an alternative embodiment, each combination of the common layer and one version-specific layer can be rendered to produce the raster for the expected common color planes. The raster for each color plane can then be compared pixel-wise to automatically determine if there are any differences. Locating any differences that exist may also be quicker given the ability to highlight pixel areas where differences occur.

Another aspect includes merging an updated version document (e.g. with corrections) into an existing layered document. This can be accomplished by eliminating entries from existing merged list 2001 that correspond to the layer associated with the version document to be replaced. Merging is accomplished by merging the updated version document in a new round, recognizing which rounds that have previously been performed.

In another aspect, a layered merged document 203 can be reproduced with multiple layers enabled to produce a desired version of the document. For example, common, English, and US layers can be enabled to reproduce a version suitable for an English-speaking US audience.

Compensating for Changes

Certain changes made while revising a document, as exemplified in the background, can cause an element of the reference document to be undesirably identified as changed when comparing elements between documents. To compensate for an undesirable change in an element's attribute, an adjustment can be made to the attribute prior to performing the comparison so that elements that are otherwise sufficiently similar will be identified as such. To compensate for changes that are not embodied in an element's attributes (e.g. display order), an adjustment can be made in the way that edit script 250 is applied when creating a target document.

Figure 21:
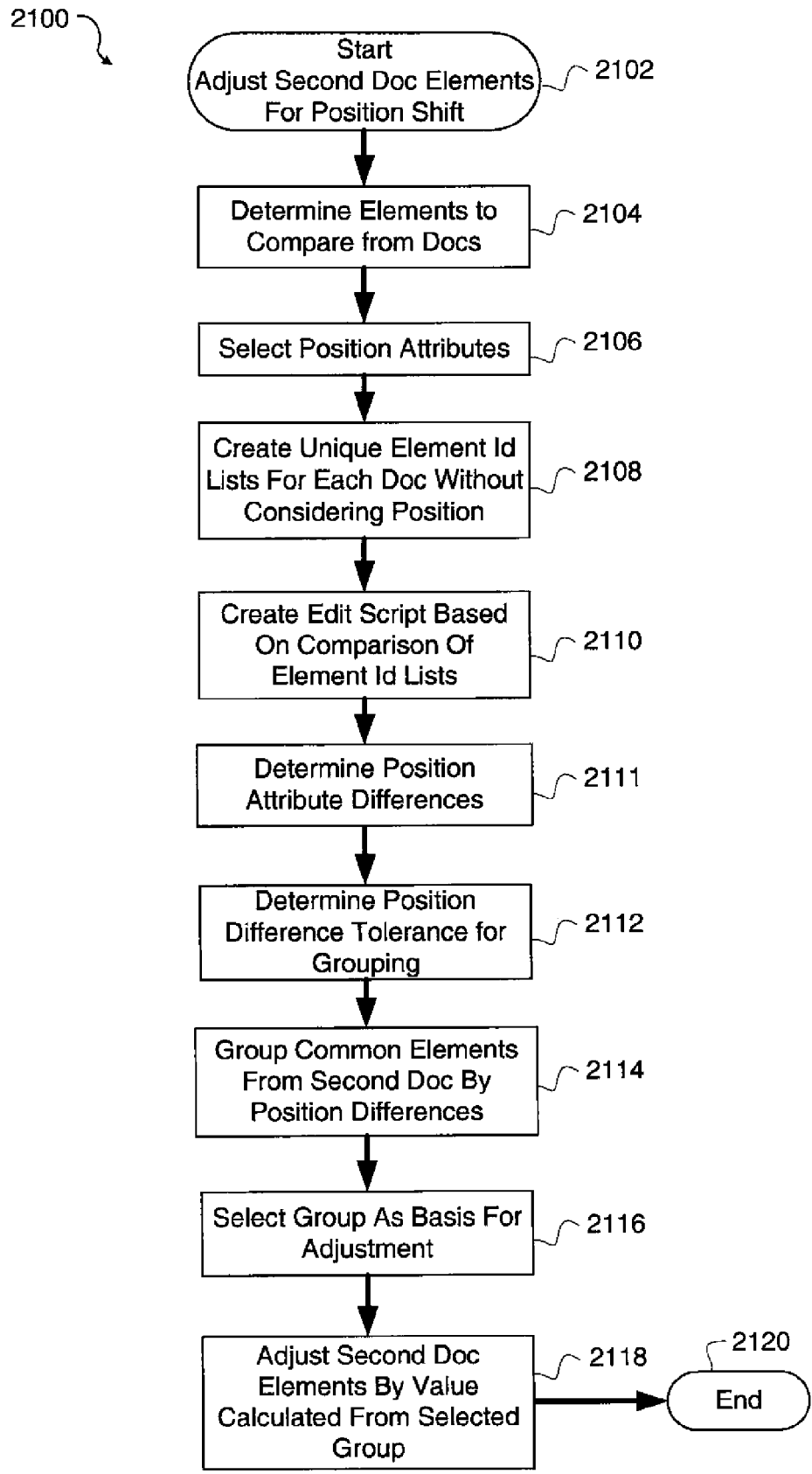
FIG. 21 is a flow chart diagram illustrating an exemplary method for adjusting graphic elements of a changed document to compensate for a change made to the document according to one embodiment of the invention.

FIG. 21 is a flow chart diagram illustrating an exemplary method for adjusting graphic elements of a changed document to compensate for a change made to the document according to one embodiment of the invention. Such method, of course, may be embodied in a computer-accessible memory system, such as data store 110, as computer code. The method corresponds to document comparator 210 adjusting for implicit changes in the position of elements which are otherwise unchanged compared to the reference document.

In this method for adjusting elements to compensate for positional shifts, the goal is to determine one positional shift adjustment to be applied to all elements of the changed document prior to comparison. The approach taken is to calculate the shift based on a group of changed elements identified as having the same positional shift in the changed document. The group of changed elements are chosen from amongst elements, identified during a comparison, as being sufficiently similar without consideration for their position.

Other methods for adjusting position attributes are possible. In other embodiments, a subset of elements may be shifted, for example, if only a subset of elements were undesirably shifted during a revision. Similarly, methods for adjusting other element attributes are possible to compensate for document revisions that would cause an undesirable identification of element changes.

The method begins at block 2102 and proceeds to block 2104 where it determines which elements from first (e.g. reference) document 201 and second (e.g. changed) document 202 are to be compared. Elements can be chosen to be consistent with the selection criteria to be used during a subsequent comparison. For example, selecting only content elements, not production elements, is commonly desired.

Proceeding at block 2106 the method selects attributes (e.g. through user input or pre-defined) corresponding to element position. For example, each clipping path control point for an element can be selected.

Proceeding at block 2108 the method creates display ordered lists of unique element identifiers corresponding to the elements selected for comparison. This is accomplished by performing an element-wise comparison of the selected elements without consideration for their position as described in FIG. 22 below. The same unique element identifier appearing in each of the lists indicates that graphic elements from each document are sufficiently similar to each other, without considering their position on the page. In other words, elements that were only shifted on the page will likely be identified with the same element identifier in the lists. Similarly, copies of elements appearing at different places on the page will share the same identifier.

Proceeding at block 2110 the method creates edit script 250 by performing an ordered comparison of the lists. Previously described methods for creating edit script 250 apply. The purpose of this step is to identify elements that are common amongst the documents. In particular, it can identify elements with the same identifier and relative display order. Since position was not considered in determining element identifiers, some incorrect identification of common elements can occur. As an example of incorrect identification of common elements, assume that a text logo exists in first document

201. It is positioned near the bottom of the page with an early display order. If a revision in second document 202 includes an addition of the same logo text near the top of the page with an earliest display order, creation of edit script 250 could identify the logo at the top of the page from second document 202 as sufficiently similar to the logo at the bottom of the page from first document 201. The text logo at the bottom of the page in second document 202 would be identified as an addition to second document 202. For most documents revisions, this incorrect identification can occur infrequently and is handled in later steps of the method.

Proceeding at block 2111 the method calculates a difference in value for position attributes between common elements of first document 201 and second document 202. The position difference is associated with the corresponding element of second document 202.

Proceeding at block 2112 the method determines a position difference tolerance for grouping elements from second document 202 identified as common by edit script 250. The tolerance can be based on accuracy attributes described above for defining the meaning of "sufficiently similar" or they can be user selectable. The tolerance defines a range of position difference values for a grouping. For example, a tolerance of 0.5 points can mean that elements having position attribute differences values within a range of 0.5 points are to be considered to have substantially the same difference value. A range can be centered at a value. For example, the method can center a range on a difference value that captures the most elements in the range. Or the range can be centered on a difference value associated with a large number of elements (e.g. an average value for a group of elements having similar positional differences). Other schemes can also be chosen to account for likely variations in difference values occurring for elements implicitly shifted by the same amount.

Proceeding at block 2114 the method groups elements from second document 202 having substantially the same positional differences. Elements having positional differences within the tolerance established at block 2112 can be grouped together as candidates for determining the positional shift adjustment. In a preferred embodiment, as each element's positional difference is determined, the element is associated with a largest existing group whose average positional difference defines a positional difference range that includes the new element's positional difference. It is possible for multiple candidate groupings to exist. One example of an alternate candidate group is one that includes an inaccurately identified common element as described above. Another example includes content changes corresponding to an explicit shift in some elements occurring in a revision cycle.

Proceeding at block 2116 the method selects one of the candidate groups as the basis for the positional shift adjustment. In one embodiment, the group with the largest number of elements is used as the basis for calculating the adjustment. As another alternative, the group that collectively paints the largest area can be used as the basis for the calculation. As another alternative, the user could be presented with information about the groups and be asked to select the group to be used for the calculation.

Proceeding at block 2118 the method examines the difference values for each element of the selected group. In one embodiment, the average value is selected as the basis for the positional shift adjustment value. Other values, derived from the group, can also be suitable as a basis. Each position attribute for every element of second document 202 is then adjusted by the adjustment value for the purposes of subsequent comparison of the first and second documents. The method then proceeds to block 2120 where it ends.

The unadjusted values for the position attributes can be retained for use in preserving elements from second document 202 and/or producing merged document 203. Different merged documents 203 can be produced for different purposes. One purpose can be to visualize the differences, excluding those suppressed by prior adjustment of attributes. Another purpose, can be to create merged document 203 with all of the changes (including those suppressed by prior adjustment of attributes) present in second document 202.

In the first case, merging using the adjusted attributes can occur using merging methods previously described. Adjusted graphic elements should appear as "common to both" in a visual comparison.

In the second case, edit script 250 can be configured to take sufficiently similar graphic elements from second document 202 instead of first document 201 so that the attribute values from second document are preserved in merged document 203. Alternatively, sufficiently similar graphic elements can be preserved from first document 201 but have position attributes adjusted based on values preserved from second document 202. Alternatively, merged document 203 can be produced using unadjusted second document 202 with the shifted elements from second document 202 designated as "unique to second document" by the comparison process. The latter example ensures that all changes, explicit or implicit, are reflected in merged document 203.

Figure 22:
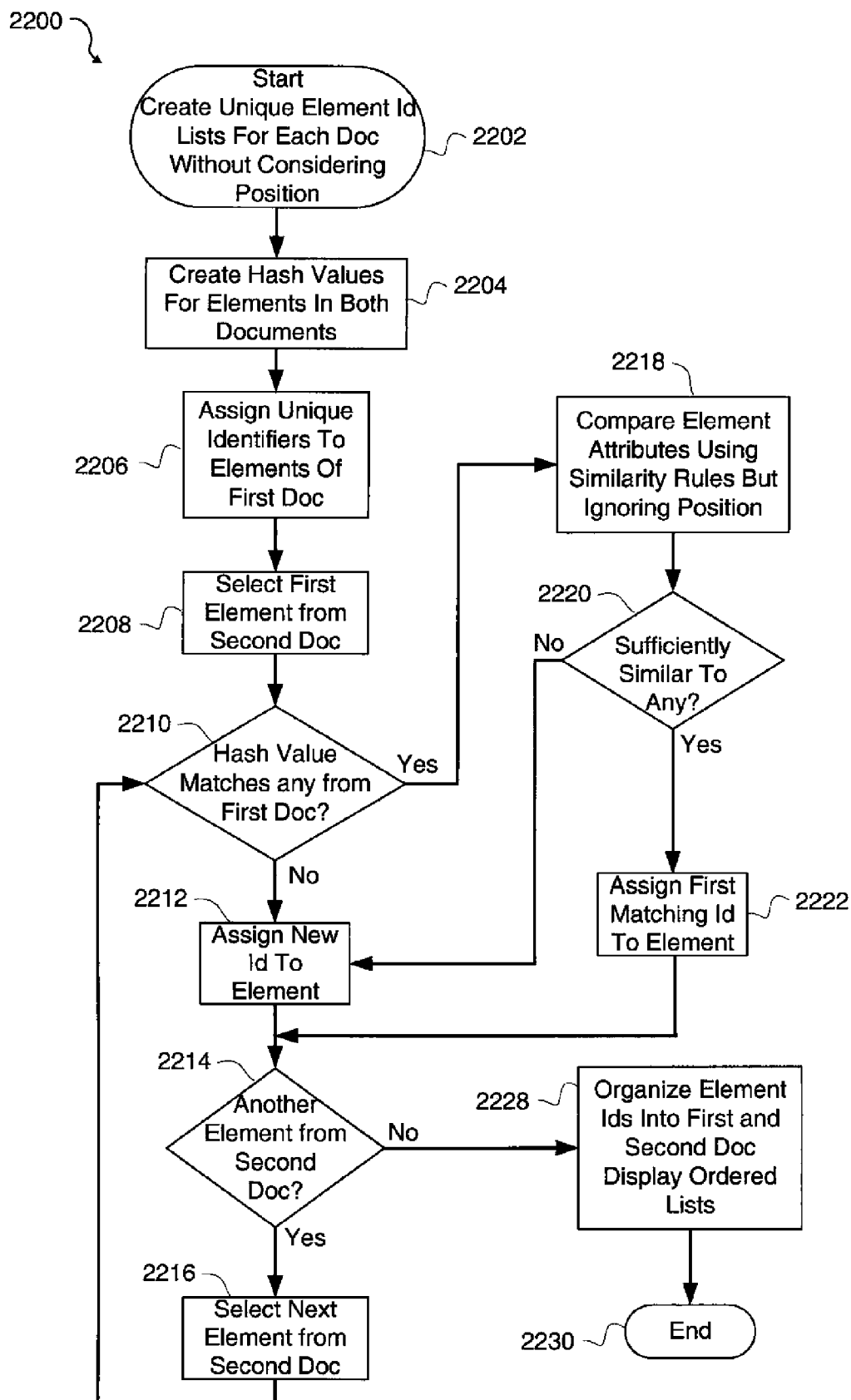
FIG. 22 is a flow chart diagram illustrating an exemplary method for creating lists of element identifiers for a reference and changed document by comparing graphic elements between the documents without consideration for element position according to one embodiment of the invention.

FIG. 22 is a flow chart diagram corresponding to an exemplary method for block 2108 of FIG. 21. It illustrates a method for creating lists of element identifiers for a first (reference) document 201 and second (changed) document 202 by comparing graphic elements between the documents without consideration for element position according to one embodiment of the invention. The method starts at block 2202 and proceeds to block 2204 where attributes of selected elements from both documents are examined to produce hash values for each element. Previously described methods for producing hash values apply.

Proceeding at block 2206 the method assigns each selected element of first document 201 a unique element identifier. Then at block 2208 the process of examining each of the selected elements from second document 202 begins. The goal of the process is to associate each element with an existing unique identifier corresponding to an element of first document 201 or to assign it a new identifier. The first element, according to display order, of selected elements from first document 201 is chosen as the current element for comparison.

Proceeding at block 2210 the method determines whether any element from first document 201 has the same hash value as the current element. If there are none, the method proceeds to block 2212. If there are matching hash values, the method proceeds to block 2218.

Proceeding at block 2218 the method examines each element with a matching hash value to determine whether the attributes of the current element are sufficiently similar to the attributes of the candidate element from first document 201. The method for determining similarity is like that described above in FIG. 4 except that the previously selected position attributes are not compared for sufficient similarity. In a preferred embodiment additional rules can test whether, for elements with multiple position attributes, all position values for the current element differ from the position values of the candidate element by a substantially similar amount. This may help distinguish an element modification from an element shift.

Upon comparing, the method, at block 2220, decides whether any element of first document 201 is sufficiently similar to the current element from second document 202. If any are, the method proceeds to block 2222 where the matching element's identifier is associated with the current element. Otherwise, the method proceeds to block 2214.

Proceeding at block 2212 the method associates a new unique identifier with the current element and then proceeds to block 2214 to decide if there are any additional elements from second document 202. If there are, the method proceeds to block 2216 to select the next element according to the display order and returns to evaluate it at block 2210. Otherwise, the method proceeds to block 2228.

Proceeding at block 2228 the method organizes the assigned element identifiers as described above in FIG. 4. The result is relative display ordered lists of element identifiers for the selected elements from the documents. The method then ends at block 2230.

When compensating for changes that are not embodied in an element's attributes (e.g. display order), an adjustment can be made in the way that an edit script 250 is applied when creating a target document. For example, referring to FIG. 9 for second document 202, assume that element 570 was moved to a display order position before the illustrated first position. This could happen, for example, if the text string was accidentally pushed to the background in a creative application during the creation of second document 202. Referring to FIG. 10 for edit script 250, the changed display order would have the effect of creating an "Add" action for element 570 from second document 202. The "Add" data item would be placed in edit script 250 prior to the "Add" item for element 802. Similarly, a "Delete" action for element 570 from first document 201 would replace the "No Action" data item at step 4H.

Without compensation, edit script 250 would produce a merged document with element 570 from first document 201 identified as "unique to first document" and element 570 from second document 202 identified as "unique to second document". To compensate, application of the data items for element 570 in edit script 250 can be overridden. In one embodiment, document merger 220 can be optionally configured to automatically override edit script actions. For example, document merger 220 can, upon identifying a "Delete" or "Add" action for an element, determine whether the same element identifier exists in both documents. If it does, this indicates that the two graphic elements are sufficiently similar except for display order. Document merger 220 can then determine which copy of the element to insert into merged document 203 and determine its relative display order in that document.

In one embodiment, document merger 220 chooses the element painting last as the element to insert and it chooses the relative display order based on the element painting last. Thus, in the above example, in response to "Add" data item from second document 202, element 570 from first document 201 is added to merged document 203 after elements 665A-D. This preserves the relative display order of element 570 from first document 201. Later, when "Delete" data item for element 570 from first document 201 is encountered, document merger 202 recognizes that element 570 has already been handled and no changes is made to merged document 203 in response. It will be recognized that many different methods can be used to achieve similar results. As an example, merging of element 570 can occur in response to the "Delete" data item associated with element 570. Derived deletion occurs during overrides consistent with the description above. Other embodiments can use other methods to choose which copy of the element to insert and to choose its relative display order.

Certain implementations of the invention comprise computer processors, which execute software instructions, which cause the processors to perform a method of the invention. For example, document comparator 210, document merger 220, comparison visualizer 230 and additional processing 240 can all be implemented by providing software, which runs on, one or more computer systems 100 and causes the computer systems to operate according to the methods described above. The program product may include any medium which carries a set of computer-readable signals including instructions which, when executed by a computer processor, cause the computer processor to execute a method of the invention. The program product may be in any of a wide variety of forms. The program product may include, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The foregoing descriptions have detailed comparison of documents, primarily in the context of a production environment. It is understood that the methods of the invention have applicability beyond those described. Examples of adapting the basic methods through different embodiments include using a subset of the methods, using alternate architectures, selection criteria and rule sets.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

PARTS LIST

0 value
1 value
2 value
3 value
4 value
100 computer system
110 data store
112 processing unit
114 graphical monitor
116 mouse
118 keyboard
200 system
201 first document
201A first list
201B first list
202 second document
202A second list
202B second list
203 merged document
204 merged document
205 merged document
210 document comparator
220 document merger
230 comparison visualizer
231 first document
232 second document
233 document 240 document processing
250 edit script
250B edit script
308 block
309 block
310 block
312 block
317 block
318 block
320 block
322 block
402 block
404 block
406 block
408 block
410 block
412 block
414 block
418 block
420 block
422 block
424 block
426 block
428 block
430 block
432 block
501 image
510 rectangular path
520 triangular path
540 square path
550 rectangular path
560 rectangular path
570 text string
611 trap graphic elements
612 trap graphic elements
621 trap graphic elements
655 trap graphic elements
655A-D trap graphic elements
704 column
706 column
708 column
710 column
802 rectangular path
810 identifier
830 rectangular path
860 identifier
910 column
1002 column
1004 column
1006 column
1012 column
1014 column
1020 column
1303 trap graphic elements
1311 trap graphic elements
1312 trap graphic elements
1321 trap graphic elements
1322 trap graphic elements
1355 trap graphic elements
1810 English document
1811 list
1812 identifier
1812A identifier
1813 comment
1820 French document
1821 French list
1822 French list
1830 U.S. document
1831 identifier list
1832 U.S. list
1840 Canadian document
1841 identifier list
1902 block
1904 block
1906 block
1908 block
1910 block
1912 block
1914 block
1916 block
1918 block
1920 block
1922 block
1924 block
1926 block
1928 block
1930 block
2001 merged list
2001A merged list
2001B merged list
2001C merged list
2001D merged list
2002 identifier
2003 layer identifier
2010 round
2020 round
2030 round
2040 round
2102 block
2104 block
2106 block
2108 block
2110 block
2111 block
2112 block
2114 block
2116 block
2118 block
2120 block
2202 block
2204 block
2206 block
2208 block
2210 block
2212 block
2214 block
2216 block
2218 block
2220 block
2222 block
2228 block
2230 block
A-Z graphic elements
CP1A clipping path
CP2 clipping path
CP2A clipping path
S1 halftone screen
S2 screen

What is claimed is:

1. A method for page-wise comparing a first document and a second document, each including at least one page, wherein a pair of pages to be compared, one from each of the first document and the second document, respectively comprise corresponding first and second pluralities of graphic elements, the method comprising the steps of:

compensating for a change made in producing the second document that would cause one of the second plurality of graphic elements to be identified as a changed element in a comparison of the first and second documents;

comparing, on the computer, the first plurality of graphic elements and the second plurality of graphic elements;

generating information describing results of the comparing step;

displaying or printing the information:

wherein compensating for the change in the second document comprises adjusting selected attributes of the one of the second plurality of graphic elements prior to performing the comparing step;

wherein the selected attributes comprise a position of the one of the second plurality of graphic elements, and wherein the adjusting selected attributes comprises providing a shift in the position of the one of the second plurality of graphic elements;

wherein providing the position shift comprises:

comparing graphic elements to identify shifted elements wherein comparing comprises performing an element-wise comparison of each graphic element of the second plurality of graphic elements with the first plurality of graphic elements and wherein shifted elements comprise elements that are sufficiently similar between the documents except for a difference in position;

determining at least one candidate group of shifted graphic elements having substantially the same difference in position;

selecting one of the candidate groups to form the basis of the position shift, if more than one candidate group is determined; and calculating the position shift based on the selected group.

2. A method according to claim 1, wherein comparing graphic elements to identify shifted elements comprises:

generating a first list and a second list, each comprising display-ordered unique identifiers corresponding to and associated with the first and second plurality of graphic elements, respectively, by comparing graphic elements of the first and second plurality of graphic elements without consideration for graphic element position;

deriving edit data from the first and second lists wherein the edit data can be used to change the first list into the second list;

identifying shifted elements based at least on the edit data, wherein a shifted element has an associated identifier with the same relative display order in both lists; and calculating a difference in position for each shifted element.

3. A method according to claim 1, wherein graphic elements having substantially the same difference in position comprise graphic elements having a plurality of differences in position, wherein the plurality of differences in position vary from each other within a configurable tolerance.

4. A method according to claim 1, wherein selecting one of the candidate groups to form the basis of the position shift comprises one of:

selecting a candidate group with the largest quantity of graphic elements; selecting a candidate group whose graphic elements collectively paint the largest area; or selecting a candidate group based on user input.

5. A method according to claim 1, wherein calculating the position shift based on the selected group comprises calculating based on an average difference in position for graphic elements of the selected group.

6. A method for page-wise comparing a first document and a second document, each including at least one page, wherein a pair of pages to be compared, one from each of the first document and the second document, respectively comprise corresponding first and second pluralities of graphic elements, the method comprising the steps of:

compensating for a change made in producing the second document that would cause one of the second plurality of graphic elements to be identified as a changed element in a comparison of the first and second documents;

comparing, on the computer, the first plurality of graphic elements and the second plurality of a graphic elements;

generating information describing results of the comparing step:

displaying or printing the information:

wherein comparing the first and second plurality of graphic elements comprises:

associating a unique identifier with each graphic element of the first plurality of graphic elements, wherein the unique identifiers associated with the graphic elements of the first plurality of graphic elements, once associated, become existing identifiers;

comparing each one of the second plurality of graphic elements with the first plurality of a graphic elements;

associating a unique identifier with a graphic element of the second plurality of graphic elements if the graphic element is not sufficiently similar to any graphic element of the first plurality of graphic elements;

associating one of the existing identifiers with a graphic element of the second plurality of graphic elements if the graphic element is sufficiently similar to a first graphic element of the first plurality of graphic elements wherein the first graphic element is associated with the one of the existing identifiers; and wherein comparing each one of the second plurality of graphic elements with the first plurality of graphic elements comprises performing a plurality of element-wise comparisons based on a plurality of similarity rules.

7. A method for page-wise comparing a first document and a second document, each including at least one page, wherein a pair of pages to be compared, one from each of the first document and the second document, respectively comprise corresponding first and second pluralities of graphic elements, the method comprising the steps of:

compensating for a change made in producing the second document that would cause one of the second plurality of graphic elements to be identified as a changed element in a comparison of the first and second documents;

comparing, on the computer, the first plurality of graphic elements and the second plurality of graphic elements;

generating information describing results of the comparing step;

displaying or printing the information;

wherein comparing the first and second plurality of graphic elements comprises:

associating a unique identifier with each graphic element of the first plurality of graphic elements, wherein the unique identifiers associated with the graphic elements of the first plurality of graphic elements, once associated, become existing identifiers;

comparing each one of the second plurality of graphic elements with the first plurality of graphic elements:

associating a unique identifier with a graphic element of the second plurality of graphic elements if the graphic element is not sufficiently similar to any graphic element of the first plurality of graphic elements;

associating one of the existing identifiers with a graphic element of the second plurality of graphic elements if the graphic element is sufficiently similar to a first graphic element of the first plurality of graphic elements wherein the first graphic element is associated with the one of the existing identifiers; and wherein two graphic elements are considered sufficiently similar if any differences in corresponding attribute values of the two graphic elements are inconsequential enough so that the two graphic elements are visually similar when printed.

8. A method for page-wise comparing a first document and a second document, each including at least one page, wherein a pair of pages to be compared, one from each of the first document and the second document, respectively comprise corresponding first and second pluralities of graphic elements, the method corn rising the steps of:

compensating for a change made in producing the second document that would cause one of the second plurality of graphic elements to be identified as a changed element in a comparison of the first and second documents;

comparing, on the computer, the first plurality of graphic elements and the second plurality of graphic elements;

generating information describing results of the comparing step;

displaying or printing the information;

wherein comparing the first and second plurality of graphic elements comprises:

associating a unique identifier with each graphic element of the first plurality of graphic elements, wherein the unique identifiers associated with the graphic elements of the first plurality of graphic elements, once associated, become existing identifiers;

comparing each one of the second plurality of graphic elements with the first plurality of graphic elements;

associating a unique identifier with a graphic element of the second plurality of graphic elements if the graphic element is not sufficiently similar to any graphic element of the first plurality of graphic elements;

associating one of the existing identifiers with a graphic element of the second plurality of graphic elements if the graphic element is sufficiently similar to a first graphic element of the first plurality of graphic elements wherein the first graphic element is associated with the one of the existing identifiers; and wherein two graphic elements are considered sufficiently similar if a predetermined difference between corresponding attribute values of the two graphic elements is within a tolerance.

9. A method for page-wise comparing a first document and a second document, each including at least one page, wherein a pair of pages to be compared, one from each of the first document and the second document, respectively comprise corresponding first and second pluralities of graphic elements, the method comprising the steps of:

compensating for a change made in producing the second document that would cause one of the second plurality of graphic elements to be identified as a changed element in a comparison of the first and second documents;

comparing, on the computer, the first plurality of graphic elements and the second plurality of graphic elements;

generating information describing results of the comparing step;

displaying or printing the information;

wherein comparing the first and second plurality of graphic elements comprises:

associating a unique identifier with each graphic element of the first plurality of graphic elements, wherein the unique identifiers associated with the graphic elements of the first plurality of graphic elements, once associated, become existing identifiers;

comparing each one of the second plurality of graphic elements with the first plurality of graphic elements;

associating a unique identifier with a graphic element of the second plurality of graphic elements if the graphic element is not sufficiently similar to any graphic element of the first plurality of graphic elements;

associating one of the existing identifiers with a graphic element of the second plurality of graphic elements if the graphic element is sufficiently similar to a first graphic element of the first plurality of graphic elements wherein the first graphic element is associated with the one of the existing identifiers; and further comprising organizing the unique identifiers into a first list and a second list, entries of the first list corresponding to a display order of the graphic elements from the first document, and entries of the second list corresponding to a display order of the graphic elements from the second document.

10. A computer-accessible memory system stoma computer code for implementing a method for page-wise comparing a first document and a second document, each including at least one page, wherein a pair of pages, one from each of the first document and second document, to be compared respectively, comprise corresponding first and second pluralities of graphic elements respectively, and wherein the computer code comprises:

code for compensating for a change made in producing the second document that would cause one of the second plurality of graphic elements to be identified as a changed element in a comparison of the first and second documents;

code for comparing the first plurality of graphic elements and the second plurality of graphic elements;

code for generating information describing results of the comparing;

wherein the computer code further comprises:

code for determining a plurality of unique identifiers corresponding to at least some of the first and second plurality of graphic elements, wherein a unique identifier is associated with both a first graphic element from the first document and a second graphic element from the second document if characteristics of the first graphic element and the second graphic element are sufficiently similar;

code for organizing the unique identifiers into a first list and a second list, the entries of the first list corresponding to a display order of the graphic elements from the first document, and the second list corresponding to a display order of the graphic elements from the second document; and code for deriving edit data from the first and second lists, wherein the edit data can be used to change the first list into the second list.

11. A computer-accessible memory system according to claim 10, wherein the computer code further comprises code for generating at least one target document based at least on the first and second documents, the first and second lists, and the edit data.

12. A computer-accessible memory system according to claim 11, wherein the at least one target document comprises a layered document having a plurality of layers including at least:

a common-to-both layer comprising graphic elements from the first document that are sufficiently similar to graphic elements from the second document;
a unique-to-first layer comprising graphic elements that are unique to the first document; and
a unique-to-second layer comprising graphic elements that are unique to the second document.

13. A computer-accessible memory system according to claim 11, wherein The computer code further comprises code for presenting a view of at least one target document comprising a plurality of layer views, a layer view comprising pixels rendered from a plurality of graphic elements associated with a layer view, the visibility of a layer view being separately controllable.

14. A method for merging documents, the method comprising:
obtaining an original document from a data store comprising a plurality of graphic elements;
modifying the original document on a computer for print production to produce a first document wherein the first document includes at least one shifted graphic element that is substantially unmodified except for a positional shift on a page;
obtaining a second document from the data store comprising a revision to the original document;
identifying The positional shift for the at least one shifted graphic element of the first document;
applying the positional shift to the corresponding graphic elements of the second document;
merging the first and second documents into a merged document on the computer by comparing graphic elements of the first and second documents; and
displaying or printing the merged document.

15. A method according to claim 14 wherein identifying the positional shift for the at least one shifted graphic element comprises:
comparing graphic elements from the first document with graphic elements from the second document to identify shifted elements;
grouping the shifted elements based on the magnitude of their positional shifts; and
identifying the at least one shifted graphic element and the corresponding positional shift by selecting one of the groups.

16. A method according to claim 15 wherein comparing graphic elements to identify shifted elements comprises:
generating a first list and a second list, each comprising display-ordered unique identifiers corresponding to and associated with graphic elements of the first and second documents, respectively, by comparing graphic elements without consideration for graphic element position;
deriving edit data from the first and second lists wherein the edit data can be used to change the first list into the second list;
identifying shifted elements based at least on the edit data, wherein a shifted element has an associated identifier with the same relative display order in both lists; and
calculating a difference in position for each shifted element based on an actual position of the shifted graphic element defined by respective documents.

17. A method according to claim 14 wherein merging comprises:
comparing graphic elements of the first and second documents to derive edit data; and
applying the edit data to the first document to produce the merged document.

18. A method according to claim 17, wherein comparing graphic elements of the first and second document comprises:
selecting a first and second plurality of graphic elements from the first and second documents, respectively;
associating a unique identifier with each graphic element of the first plurality of graphic elements, wherein the unique identifiers associated with the graphic elements of the first plurality of graphic elements, once associated, become existing identifiers;
comparing each one of the second plurality of graphic elements with the first plurality of graphic elements;
associating a unique identifier with a graphic element of the second plurality of graphic elements if the graphic element is not sufficiently similar to any graphic element of the first plurality of graphic elements; and
associating one of the existing identifiers with a graphic element of the second plurality of graphic elements if the graphic element is sufficiently similar to a first graphic element of the first plurality of graphic elements wherein the first graphic element is associated with the one of the existing identifiers.

19. A method according to claim 18, wherein comparing each one of the second plurality of graphic elements with the first plurality of graphic elements comprises performing a plurality of element-wise comparisons based on a plurality of similarity rules.

20. A method according to claim 19, wherein two graphic elements are considered sufficiently similar if any differences in corresponding attribute values of the two graphic elements are inconsequential enough so that the two graphic elements are visually similar when printed.

21. A method according to claim 19, wherein two graphic elements are considered sufficiently similar if a predetermined difference between corresponding attribute values of the two graphic elements is within a tolerance.

22. A method according to claim 19, further comprising organizing the unique identifiers into a first list and a second list, entries of the first list corresponding to a display order of the graphic elements from the first document, and entries of the second list corresponding to a display order of the graphic elements from the second document.

23. A method according to claim 14 comprising visualizing the merged document to identify differences between the documents.

24. A computer-accessible memory system storing computer code for implementing a method for merging documents, the computer code comprising:
code for obtaining an original document comprising a plurality of graphic elements;
code for modifying the original document for print production to produce a first document wherein the first document includes at least one shifted graphic element that is substantially unmodified except for a positional shift on a page;
code for obtaining a second document comprising a revision to the original document;
code for identifying the positional shift for the at least one shifted graphic element of the first document;
code for applying the positional shift to the corresponding graphic elements of the second document; and
code for merging the first and second documents into a merged document by comparing graphic elements of the first and second documents.

* * * * *

UNITED STATES PATENT AND TRADEMARK OFFICE
CERTIFICATE OF CORRECTION

PATENT NO. : 7,694,217 B2 Page 1 of 1
APPLICATION NO. : 11/421210
DATED : April 6, 2010
INVENTOR(S) : Lawrence Croft et al.

It is certified that error appears in the above-identified patent and that said Letters Patent is hereby corrected as shown below:

| Issued Patent | | Description of Error |
|---|---|---|
| Column | Line | |
| 31 | 11 | In Claim 1, delete "information:" and insert -- information; -- |
| 32 | 12 | In Claim 6, after "of" delete "a" |
| 32 | 14 | In Claim 6, delete "step:" and insert -- step; -- |
| 32 | 15 | In Claim 6, delete "information:" and insert -- information; -- |
| 32 | 24 | In Claim 6, after "of" delete "a" |
| 32 | 63 | In Claim 7, delete "elements:" and insert -- elements; -- |
| 33 | 17 | In Claim 8, delete "corn rising" and insert -- comprising -- |
| 33 | 34 (Approx.) | In Claim 8, delete "identifiers:" and insert -- identifiers; -- |
| 34 | 24 | In Claim 10, delete "stoma" and insert -- storing -- |
| 35 | 9 | In Claim 13, delete "The" and insert -- the -- |
| 35 | 26 | In Claim 14, delete "The" and insert -- the -- |

Signed and Sealed this

Third Day of August, 2010

David J. Kappos
*Director of the United States Patent and Trademark Office*